US012781849B2

(12) United States Patent
Tajima et al.

(10) Patent No.: US 12,781,849 B2
(45) Date of Patent: Nov. 3, 2026

(54) WORM GEAR REDUCER

(71) Applicant: NSK STEERING & CONTROL, INC., Tokyo (JP)

(72) Inventors: Ikuya Tajima, Gunma (JP); Takahiro Izumi, Gunma (JP)

(73) Assignee: NSK STEERING & CONTROL, INC., Tokyo (JP)

( * ) Notice: Subject to any disclaimer, the term of this patent is extended or adjusted under 35 U.S.C. 154(b) by 0 days.

(21) Appl. No.: 19/100,456

(22) PCT Filed: Jul. 27, 2023

(86) PCT No.: PCT/JP2023/027670
§ 371 (c)(1),
(2) Date: Jan. 31, 2025

(87) PCT Pub. No.: WO2024/029451
PCT Pub. Date: Feb. 8, 2024

(65) Prior Publication Data

US 2026/0049654 A1 Feb. 19, 2026

(30) Foreign Application Priority Data

Aug. 2, 2022 (JP) ................................ 2022-123209

(51) Int. Cl.
*F16H 57/12* (2006.01)
*B62D 5/04* (2006.01)
(Continued)

(52) U.S. Cl.
CPC ............... *F16H 57/12* (2013.01); *F16H 1/16* (2013.01); *F16H 57/021* (2013.01);
(Continued)

(58) Field of Classification Search
CPC ...... F16H 1/16; F16H 55/24; F16H 2057/127; F16H 57/12; F16H 2057/0213
See application file for complete search history.

(56) References Cited

U.S. PATENT DOCUMENTS 7,100,734 B2 * 9/2006 Segawa ................ F16H 57/021
74/552
2022/0099159 A1 3/2022 Oosawa et al.

FOREIGN PATENT DOCUMENTS

JP 2007-239787 A 9/2007
JP 2018-204661 A 12/2018
(Continued)

OTHER PUBLICATIONS

International Search Report (PCT/ISA/210) dated Sep. 5, 2023, issued by International Searching Authority for International Application No. PCT/JP2023/027670.
(Continued)

*Primary Examiner* — Jake Cook
(74) *Attorney, Agent, or Firm* — Sughrue Mion, PLLC

(57) ABSTRACT

A worm gear reducer including an elastic urging portion (6) and an elastic clamping portion (7). The elastic urging portion (6) urges a radially inner side member (5) toward a worm wheel (3) side. The elastic clamping portion (7) has a pair of clamping plate springs (41) that are disposed on both sides of the radially inner side member (5) in a third direction, in a portion between an outer circumferential surface of the radially inner side member (5) and an inner circumferential surface of a radially outer side member (9). Each of the clamping plate springs (41) exhibits a non-linear spring characteristic in which a spring constant increases as a deflection amount in a direction including a third-direction component increases.

14 Claims, 21 Drawing Sheets

(51) Int. Cl.

| | |
|---|---|
| ***F16H 1/16*** | (2006.01) |
| ***F16H 57/02*** | (2012.01) |
| ***F16H 57/021*** | (2012.01) |
| ***F16H 57/039*** | (2012.01) |

(52) U.S. Cl.
CPC ......... *F16H 57/039* (2013.01); *B62D 5/0403* (2013.01); *F16H 2057/02034* (2013.01); *F16H 2057/02082* (2013.01); *F16H 2057/0213* (2013.01); *F16H 2057/127* (2013.01)

(56) References Cited

FOREIGN PATENT DOCUMENTS

| | | | |
|---|---|---|---|
| JP | 2020-128803 | A | 8/2020 |
| JP | 2021-17930 | A | 2/2021 |
| WO | 2021241135 | A1 | 12/2021 |

OTHER PUBLICATIONS

Written Opinion (PCT/ISA/237) dated Sep. 5, 2023, issued by International Searching Authority for International Application No. PCT/JP2023/027670.
Extended European Search Report dated Jul. 17, 2026, issued by European Patent Office in Application No. 23850006.0.

* cited by examiner 44
42
7
44
61
41
41
43
43
46
45
45
46
60

7
44
44
7
44
46
46
44
46
R2
41
41
41
41
46
β
46
β
43
R1
43
43
43
β
β
46
R2
46
44
α
α
44
46
46
44
Rj
44
44
7
42
42
45
60
45
60
42
45
60
45
45

46
42
7
46
61
41
41
43
43
44
45
45
44
60

WORM GEAR REDUCER

CROSS-REFERENCES TO RELATED APPLICATIONS

This is a National Stage of International Application No. PCT/JP2023/027670 filed Jul. 27, 2023, claiming priority from Japanese Patent Application No. 2022-123209 filed on Aug. 2, 2022, the disclosures of which are incorporated herein in their entirety by reference.

Technical Field

The present disclosure relates to a worm gear reducer that can be incorporated into an electric power steering device or the like.

In the field of steering devices, an electric power steering device is widely used in which an electric motor serves as an auxiliary power source to reduce a force required for a driver to operate a steering wheel.

The electric power steering device includes a worm gear reducer for increasing the torque of the electric motor. The worm gear reducer includes a housing, a worm wheel, and a worm. The housing includes a wheel accommodating portion, and a worm accommodating portion that has a central axis at a skew position with respect to a central axis of the wheel accommodating portion and whose intermediate portion in an axial direction is open to the wheel accommodating portion. The worm wheel has wheel teeth on an outer circumferential surface thereof and is rotatably supported inside the wheel accommodating portion. The worm has worm teeth that mesh with the wheel teeth on an outer circumferential surface thereof and is rotatably supported inside the worm accommodating portion. The torque of the electric motor is increased by being transmitted to the worm wheel via the worm, and is then applied as auxiliary power to steering force transmission members such as a steering shaft, a pinion shaft or a rack shaft of a steering gear unit. Accordingly, the force required for the driver to operate the steering wheel is reduced.

In the worm gear reducer, unavoidable backlash is present at a meshing portion of the wheel teeth and the worm teeth due to dimensional errors and assembly errors of components that constitute the worm gear reducer. Due to the presence of this backlash, an unpleasant tooth hitting sound may occur at the meshing portion when changing a rotational direction of the steering wheel.

JP2020-128803A describes a structure in which a tip end portion of a worm is urged toward a worm wheel side in order to suppress the occurrence of tooth hitting sound in a meshing portion of wheel teeth and worm teeth. The structure includes an outer fitting member that is fitted around a support bearing rotatably supporting a tip end portion of the worm and is disposed so as to be able to move toward and away from the worm wheel, and an urging spring (elastic urging portion) that is provided between the outer fitting member and the worm accommodating portion. The urging spring is elastically deformed, and urges the outer fitting member toward a worm wheel side by an elastic restoring force of the urging spring. Accordingly, the backlash of the meshing portion of the wheel teeth and the worm teeth is suppressed, and the occurrence of the tooth hitting sound is suppressed.

In the structure described in JP2020-128803A, in order to enable the tip end portion of the worm to move toward and away from the worm wheel, a gap is provided between an outer circumferential surface of the outer fitting member fitted around the support bearing rotatably supporting the tip end portion of the worm and an inner circumferential surface of the worm accommodating portion. Therefore, the tip end portion of the worm can also move in a third direction orthogonal to both a first direction, which is an urging direction of the urging spring, and a second direction, which is the axial direction of the worm accommodating portion, based on the presence of the gap.

On the other hand, a meshing reaction force acts on the worm from the meshing portion of the worm teeth and the wheel teeth. The meshing reaction force includes a force of a third-direction component. A direction of the third-direction component is reversed according to a rotational direction of the worm. During the operation of the automobile, the third-direction component of the vibration that is reversely input from a tire is transmitted to the worm. Therefore, if the tip end portion of the worm is allowed to move in the third direction without resistance due to the presence of the gap, the third-direction component of the meshing reaction force acting on the worm and the third-direction component of the vibration reversely input to the worm will cause the outer circumferential surface of the outer fitting member to collide forcefully with the inner circumferential surface of the worm accommodating portion in the third direction, and abnormal noise such as harsh hitting sound or rattling noise is likely to occur.

The structure described in JP2020-128803A includes a pair of clamping plate springs that clamp the outer fitting member from both sides in the third direction in order to suppress the occurrence of the abnormal noise. By suppressing momentum when the tip end portion of the worm moves in the third direction by the pair of clamping plate springs, the occurrence of the abnormal noise as described above is suppressed.

CITATION LIST

Patent Literature

Patent Literature 1: JP2020-128803A

SUMMARY OF INVENTION

Technical Problem

The structure in the related art described in JP2020-128803A has room for improvement from the following aspects.

That is, in the structure in the related art described in JP2020-128803A, in order to smooth an urging operation of the tip end portion of the worm by the urging spring, that is, to smooth the movement of the tip end portion of the worm in the first direction, it is required that a spring constant of the pair of clamping plate springs is small. On the other hand, in order to sufficiently suppress the forceful collision of the outer circumferential surface of the outer fitting member with the inner circumferential surface of the worm accommodating portion in the third direction by the third-direction component of the meshing reaction force acting on the worm and the third-direction component of the vibration reversely input to the worm, it is required that the spring constant of the pair of clamping plate springs is large.

However, in the structure in the related art described in JP2020-128803A, since the spring constant of the pair of clamping plate springs is constant, it is difficult to meet the two requirements described above that conflict with each other.

An object of the present disclosure is to provide a worm gear reducer capable of smoothly performing an urging operation of a tip end portion of a worm by an elastic urging portion and easily suppressing momentum of a collision between members in a third direction around the tip end portion of the worm.

Solution to Problem

A worm gear reducer according to an aspect of the present disclosure includes a housing, a worm wheel, a worm, a support bearing, an elastic urging portion, and an elastic clamping portion.

The housing includes a wheel accommodating portion, and a worm accommodating portion that has a central axis at a skew position with respect to a central axis of the wheel accommodating portion and whose intermediate portion in an axial direction is open to the wheel accommodating portion.

The worm wheel has wheel teeth on an outer circumferential surface thereof and is rotatably supported inside the wheel accommodating portion.

The worm has worm teeth that mesh with the wheel teeth on an outer circumferential surface thereof and is rotatably supported inside the worm accommodating portion.

The support bearing is fitted around a tip end portion of the worm.

The elastic urging portion urges an radially inner side member that is the support bearing or an outer fitting member fitted around the support bearing toward a worm wheel side.

The elastic clamping portion has a pair of clamping plate springs that are disposed on both sides of the radially inner side member in a third direction orthogonal to both a first direction, which is an urging direction by the elastic urging portion and a second direction that is an axial direction of the worm accommodating portion, in a portion between an outer circumferential surface of the radially inner side member and an inner circumferential surface of an radially outer side member that is the worm accommodating portion or an inner fitting member fitted inside the worm accommodating portion.

In the worm gear reducer according to an aspect of the present disclosure, each of the clamping plate springs constituting the pair of clamping plate springs exhibits a non-linear spring characteristic in which a spring constant increases as a deflection amount in a direction including a third-direction component. Here, the increase in the spring constant as the deflection amount in the direction including the third-direction component increases may be stepwise increase or continuous increase.

In the worm gear reducer according to an aspect of the present disclosure, each of the clamping plate springs constituting the pair of clamping plate springs has an intermediate portion in a circumferential direction in contact with the inner circumferential surface of the radially outer side member, and both side portions in the circumferential direction in contact with the outer circumferential surface of the radially inner side member, and as the deflection amount in the direction including the third-direction component increases, the spring constant increases as a distance between contact portions of both the side portions in the circumferential with respect to the outer circumferential surface of the radially inner side member decreases.

In the worm gear reducer according to an aspect of the present disclosure, an intermediate portion in the circumferential direction of each of the pair of clamping plate springs constituting the pair of clamping plate springs intersects a third direction straight line Lx that is a straight line that passes through a center of the worm and extends in the third direction when viewed from the second direction.

In the worm gear reducer according to an aspect of the present disclosure, a portion of an inner circumferential surface of the radially outer side member that is in contact with the intermediate portion in the circumferential direction of each of the clamping plate springs constituting the pair of clamping plate springs is implemented by a flat portion extending in the first direction.

In the worm gear reducer according to an aspect of the present disclosure, an intermediate portion in the circumferential direction of one clamping plate spring constituting the pair of clamping plate springs intersects a radiation straight line L1 including a vector of a meshing reaction force F1 applied to the worm from a meshing portion between the worm teeth and the wheel teeth when the worm rotates in a predetermined direction when viewed from a second direction, and an intermediate portion in the circumferential direction of the other clamping plate spring constituting the pair of clamping plate springs intersects a radiation straight line L2 including a vector of a meshing reaction force F2 applied to the worm from the meshing portion when the worm rotates in a direction opposite to the predetermined direction when viewed from the second direction.

In the worm gear reducer according to an aspect of the present disclosure, in a target clamping plate spring that is at least any one of the pair of clamping plate springs, the intermediate portion in the circumferential direction is implemented by a first portion having a partial cylindrical shape curved along the outer circumferential surface of the radially inner side member. Each of both the side portions in the circumferential direction is implemented by a second portion having a partial cylindrical shape curved along the outer circumferential surface of the radially inner side member and smoothly continuous with the first portion. A curvature radius of a radially inner surface of the first portion in a free state is smaller than a curvature radius of the outer circumferential surface of the radially inner side member. A curvature radius of a radially inner surface of the second portion in the free state is larger than the curvature radius of the radially inner surface of the first portion in the free state. Here, the curvature radius of the radially inner surface of the second portion in the free state can be constant over the entire length in the circumferential direction, or can be changed stepwise or continuously in the circumferential direction.

In the worm gear reducer according to an aspect of the present disclosure, in a target clamping plate spring that is at least any one of the pair of clamping plate springs, the intermediate portion in the circumferential direction is implemented by a first portion having a partial cylindrical shape curved along the outer circumferential surface of the radially inner side member. Each of both the side portions in the circumferential direction is implemented by a second portion having a partial cylindrical shape curved along the outer circumferential surface of the radially inner side member and smoothly continuous with the first portion. Curvature radii of radially inner surfaces of the first portion and each of the second portions in a free state are equal to each other and smaller than a curvature radius of the outer circumferential surface of the radially inner side member. Each of the second portions has, on a circumferential end portion of a first portion side, a low-rigidity plate spring portion having a lower rigidity than the remainder in the circumferential direction and the first portion.

In this case, in the worm gear reducer according to an aspect of the present disclosure, each of the clamping plate springs constituting the pair of clamping plate springs is the target clamping plate spring, the elastic clamping portion has a circumferential connection portion that connects circumferential end portions of the pair of clamping plate springs on a side close to the worm wheel to each other in the circumferential direction, the circumferential connection portion has a partial cylindrical shape curved along the outer circumferential surface of the radially inner side member, and is smoothly continuous with the pair of clamping plate springs, and a curvature radius of a radially inner surface of the circumferential connection portion in the free state is equal to the curvature radii of the radially inner surfaces of the first portion and each of the second portions in the free state.

In the worm gear reducer of an aspect of the present disclosure, the elastic clamping portion has a circumferential connection portion connecting circumferential end portions of the pair of clamping plate springs on a side that is close to the worm wheel to each other in the circumferential direction.

In the worm gear reducer of an aspect of the present disclosure, the circumferential connection portion has a low-rigidity connection portion having rigidity lower than the pair of clamping plate springs in at least a part thereof in the circumferential direction.

In the worm gear reducer of an aspect of the present disclosure, for each of the clamping plate springs constituting the pair of clamping plate springs, a residual stress is applied to a portion that is in contact with the inner circumferential surface of the radially outer side member.

In the worm gear reducer of an aspect of the present disclosure, the elastic clamping portion has a circumferential position positioning piece engaged with the radially inner side member or the radially outer side member in the circumferential direction.

In the worm gear reducer of an aspect of the present disclosure, the elastic clamping portion has an axial position positioning piece engaged with the radially inner side member or the radially outer side member in the axial direction.

In the worm gear reducer of an aspect of the present disclosure, when a horizontal axis represents a deflection amount in the third direction and a vertical axis represents a load, the non-linear spring characteristic is represented by a graph that is downwardly convex, with a slope increasing as the deflection amount in the third direction increases.

The present disclosure can be implemented by appropriately combining the above-described aspects to the extent that no contradiction occurs.

Advantageous Effects of Invention

According to the worm gear reducer of an aspect of the present disclosure, urging operation of the tip end portion of the worm by the elastic urging portion can be made smooth, and momentum of the collision between the members in the third direction can be easily suppressed around the tip end portion of the worm.

DESCRIPTION OF EMBODIMENTS

First Example

Figure 1:
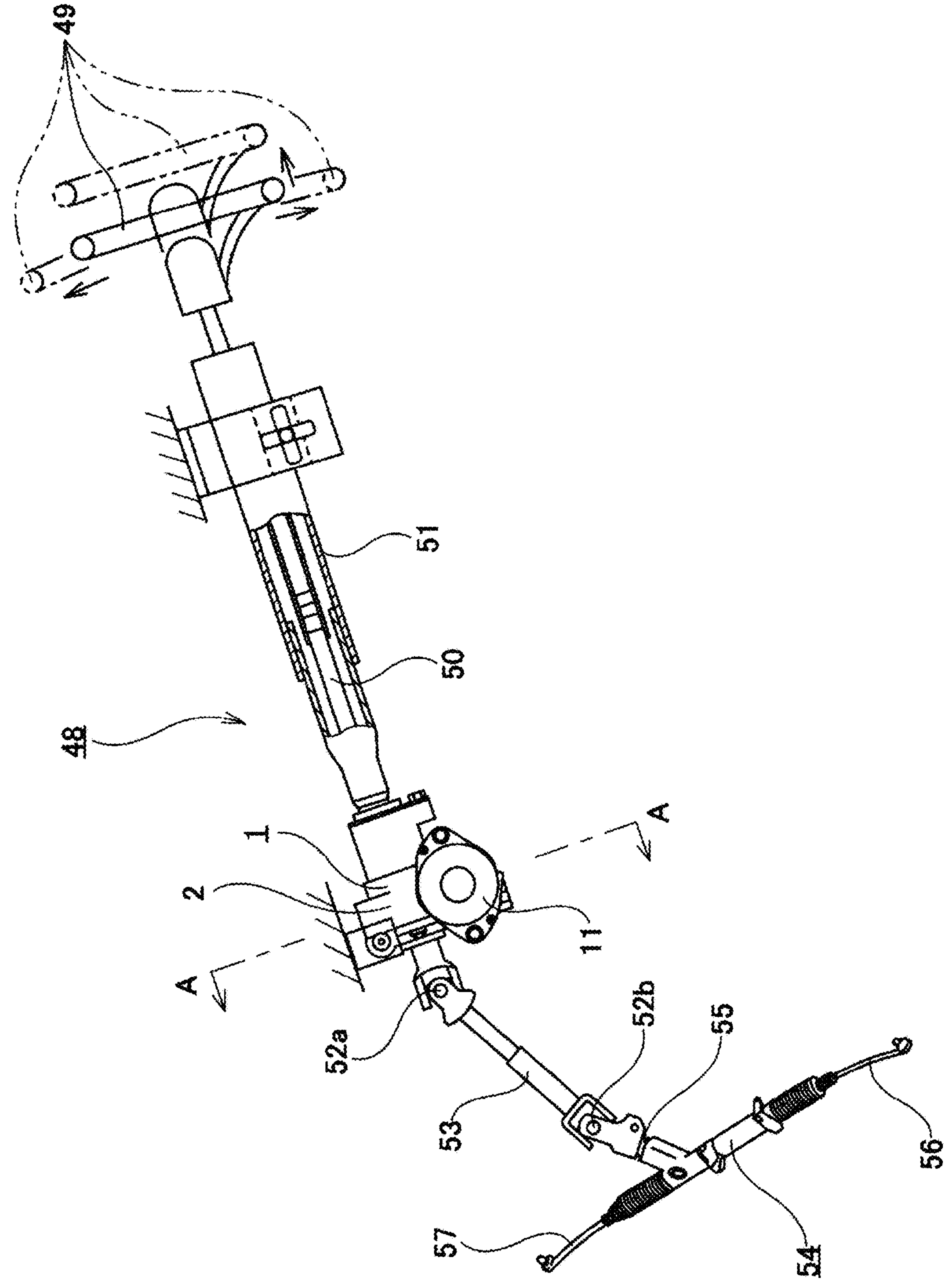
FIG. 1 is a diagram showing an electric power steering device incorporating a worm gear reducer according to a first example of an embodiment of the present disclosure.

A first example of an embodiment of the present disclosure will be described with reference to FIGS. 1 to 17C.

(1) Worm Gear Reducer

The worm gear reducer of the present disclosure can be applied to a worm gear reducer incorporated into a part of various mechanical devices. In this example, a case in which the present disclosure is applied to a worm gear reducer incorporated in a part of an electric power steering device for an automobile is applied.

As shown in FIGS. 1 to 5, the worm gear reducer 1 of this example includes a housing 2, a worm wheel 3, a worm 4, a support bearing 5, an elastic urging portion 6, and an elastic clamping portion 7.

The housing 2 includes a wheel accommodating portion 8, and a worm accommodating portion 9 that has a central axis at a skew position with respect to a central axis of the wheel accommodating portion 8 and whose intermediate portion in an axial direction is open to the wheel accommodating portion 8.

Figure 2:
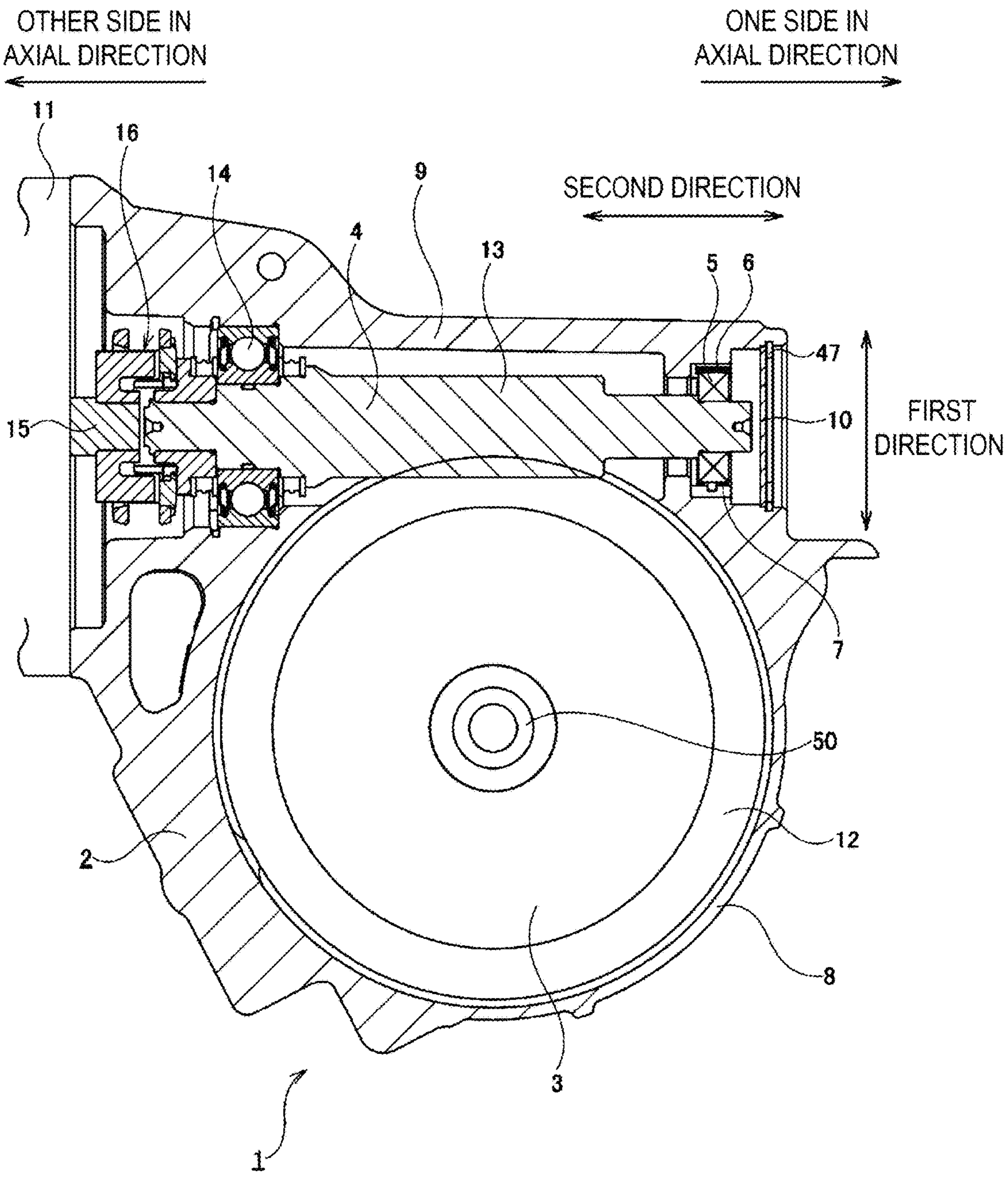
FIG. 2 is a cross-sectional view taken along a line A-A of FIG. 1.

The wheel accommodating portion 8 has a cylindrical shape. In FIG. 2, the central axis of the wheel accommodating portion 8 extends in a front-back direction.

The worm accommodating portion 9 has a cylindrical shape, and has opening portions on end portions at both sides thereof in the axial direction. In FIG. 2, the central axis of the worm accommodating portion 9 extends in a left-right direction. An opening portion on one side of the worm accommodating portion 9 in the axial direction is closed by a lid body 10 mounted on the opening portion by using a retaining ring 47. An opening portion on the other side of the worm accommodating portion 9 in the axial direction is closed by an electric motor 11 coupled and fixed to the housing 2.

The one side in the axial direction is a right side in FIG. 2, and the other side in the axial direction is a left side in FIG. 2, relating to the worm accommodating portion 9 and each member accommodated in the worm accommodating portion 9.

The worm wheel 3 has helical gear wheel teeth 12 on an outer circumferential surface thereof, and is rotatably supported inside the wheel accommodating portion 8. In this example, the worm wheel 3 is fitted around and fixed to a portion in the axial direction (in this example, a front side portion of a steering shaft 50 in the front-rear direction of a vehicle) of a rotating shaft rotatably supported inside the wheel accommodating portion 8.

The worm 4 has threaded worm teeth 13 meshing with the wheel teeth 12 of the worm wheel 3 on an outer circumferential surface of the intermediate portion in the axial direction and is rotatably supported inside the worm accommodating portion 9. In this example, a thread direction of the worm teeth 13 is a right-hand thread direction. However, the thread direction may be a left-hand thread direction.

A portion of the worm 4 near a proximal end (a portion near a left end in FIG. 2) is rotatably supported by a ball bearing 14 with respect to the worm accommodating portion 9. In this example, an outer ring of the ball bearing 14 is fitted into the worm accommodating portion 9 via a gap in a radial direction, and an inner ring of the ball bearing 14 is fitted around the portion of the worm 4 near the proximal end via the gap in the radial direction. Accordingly, the portion of the worm 4 near the proximal end is supported by the worm accommodating portion 9 so as to be capable of rotation and oscillating displacement. The outer ring of the ball bearing 14 may be fitted into the worm accommodating portion 9 by interference fit. Note that the structure in which the portion of the worm 4 near the proximal end is supported by the worm accommodating portion 9 so as to be capable of rotation and oscillating displacement is not limited to the structure of this example, and various structures may be adopted.

A proximal end portion the worm 4 is connected to a tip end portion of an output shaft 15 of the electric motor 11 via a coupling 16 so as to be capable of torque transmission and oscillating displacement. Note that the proximal end portion of the worm 4 may be connected to the tip end portion of the output shaft 15 of the electric motor 11 so as to be capable of torque transmission and oscillating displacement by spline engagement or the like.

The support bearing 5 is fitted around a tip end portion of the worm 4. The tip end portion of the worm 4 is a tip end portion on one side in the axial direction (right end portion in FIG. 2) in a "second direction" that is the axial direction of the worm accommodating portion 9 (left-right direction in FIGS. 2 and 3, front-back direction in FIG. 5).

Figure 3:
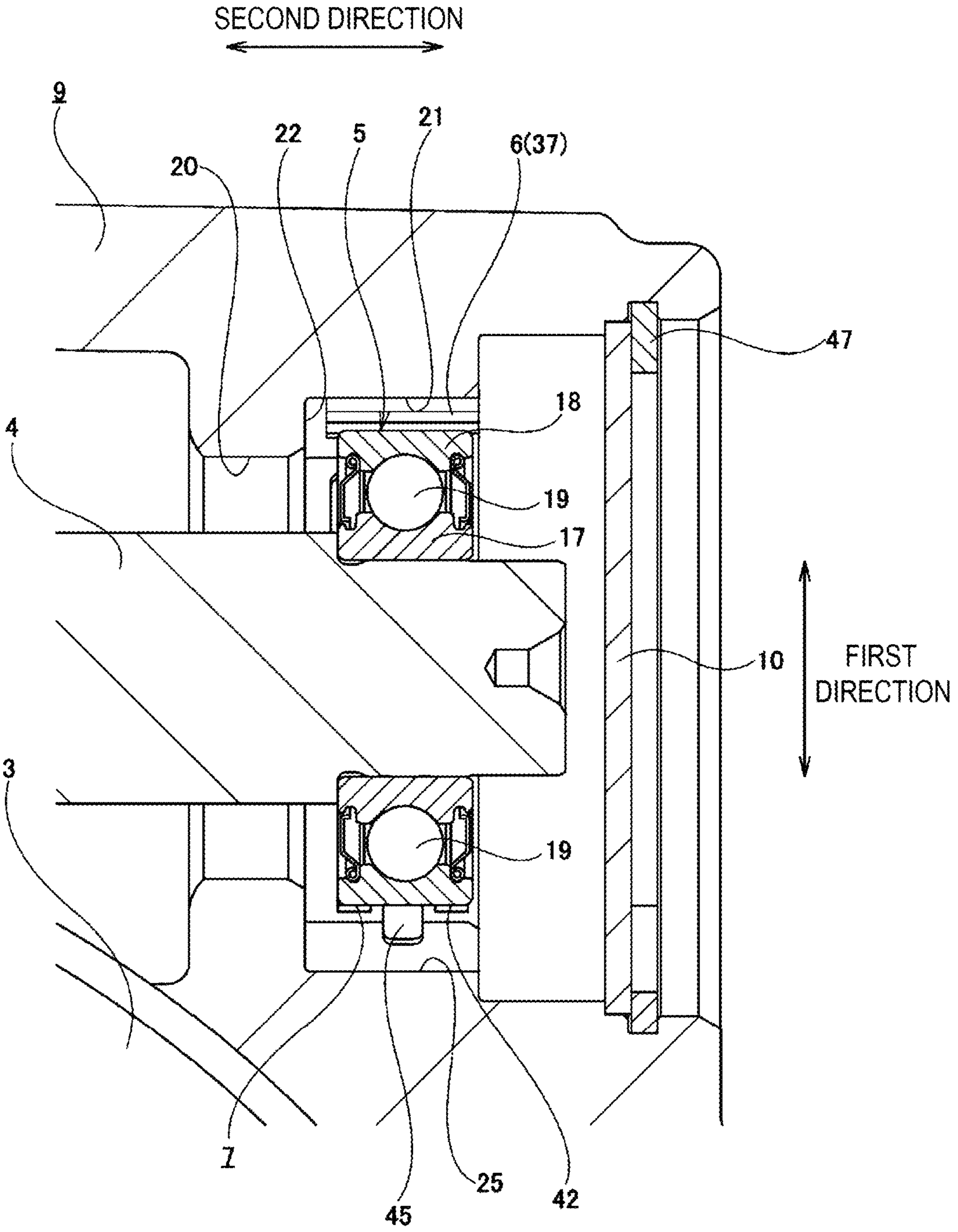
FIG. 3 is an enlarged view of an upper right portion of FIG. 2.
Figure 4:
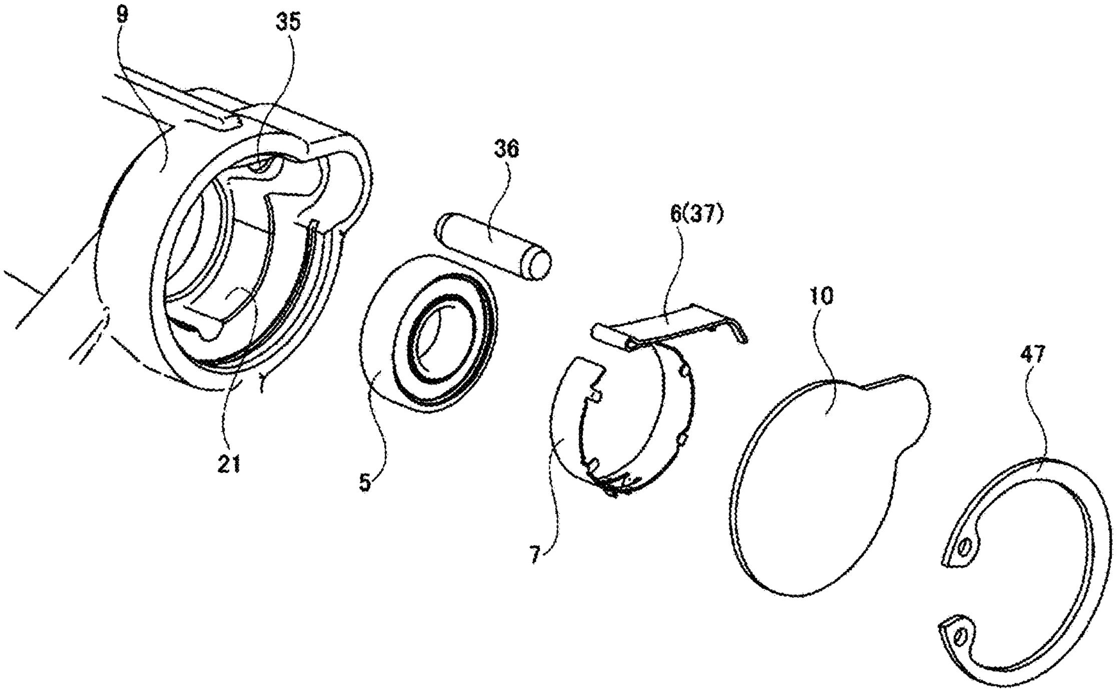
FIG. 4 is an exploded perspective view of the portion shown in FIG. 3.

In this example, the support bearing 5 is implemented by a ball bearing. That is, as shown in FIG. 3, the support bearing 5 includes an inner ring 17, an outer ring 18, and a plurality of balls 19 disposed between an inner ring raceway provided on an outer circumferential surface of the inner ring 17 and an outer ring raceway provided on an inner circumferential surface of the outer ring 18. The inner ring 17 is fitted around and fixed to the tip end portion of the worm 4. Note that, in the case of carrying out the present disclosure, the support bearing can be implemented by another type of bearing such as a roller bearing.

In this example, an inner circumferential surface of the worm accommodating portion 9 has a small-diameter cylindrical surface portion 20 having a smaller diameter than an outer circumferential surface of the support bearing 5, that is, the outer circumferential surface of the outer ring 18, at a portion near the end portion on one side in the axial direction, and a holding portion 21 having a larger diameter than the small-diameter cylindrical surface portion 20 at a portion adjacent to one side of the small-diameter cylindrical surface portion 20 in the axial direction. The small-diameter cylindrical surface portion 20 and the holding portion 21 are connected by a stepped surface 22 facing the one side in the axial direction. In this example, the support bearing 5 is disposed inside the holding portion 21 to be movable in the radial direction.

In the following description, the direction in which the worm 4 moves toward and away from the worm wheel 3 (upper-lower direction in FIGS. 2, 3, and 5), which is an urging direction by the elastic urging portion 6, is referred to as a "first direction", the axial direction of the worm accommodating portion 9 (left-right direction in FIGS. 2 and 3, front-back direction in FIG. 5) is referred to as a "second direction", and a direction orthogonal to both the first direction and the second direction (front-back direction in FIGS. 2 and 3, left-right direction in FIG. 5) is referred to as a "third direction".

Figure 5:
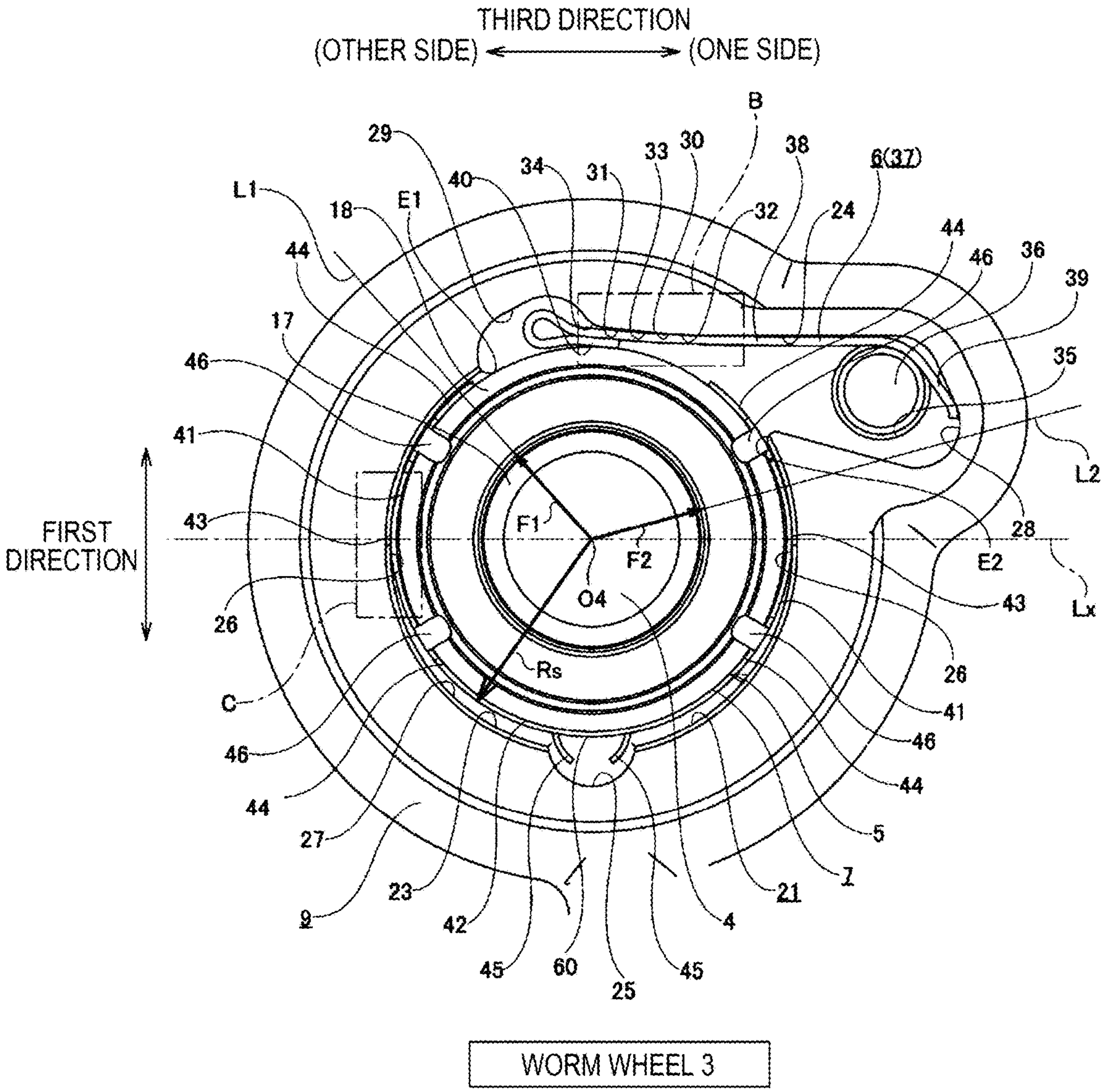
FIG. 5 is a view seen from a right side of FIG. 3 by removing a lid body and a retaining ring from the portion shown in FIG. 3.
Figure 8:
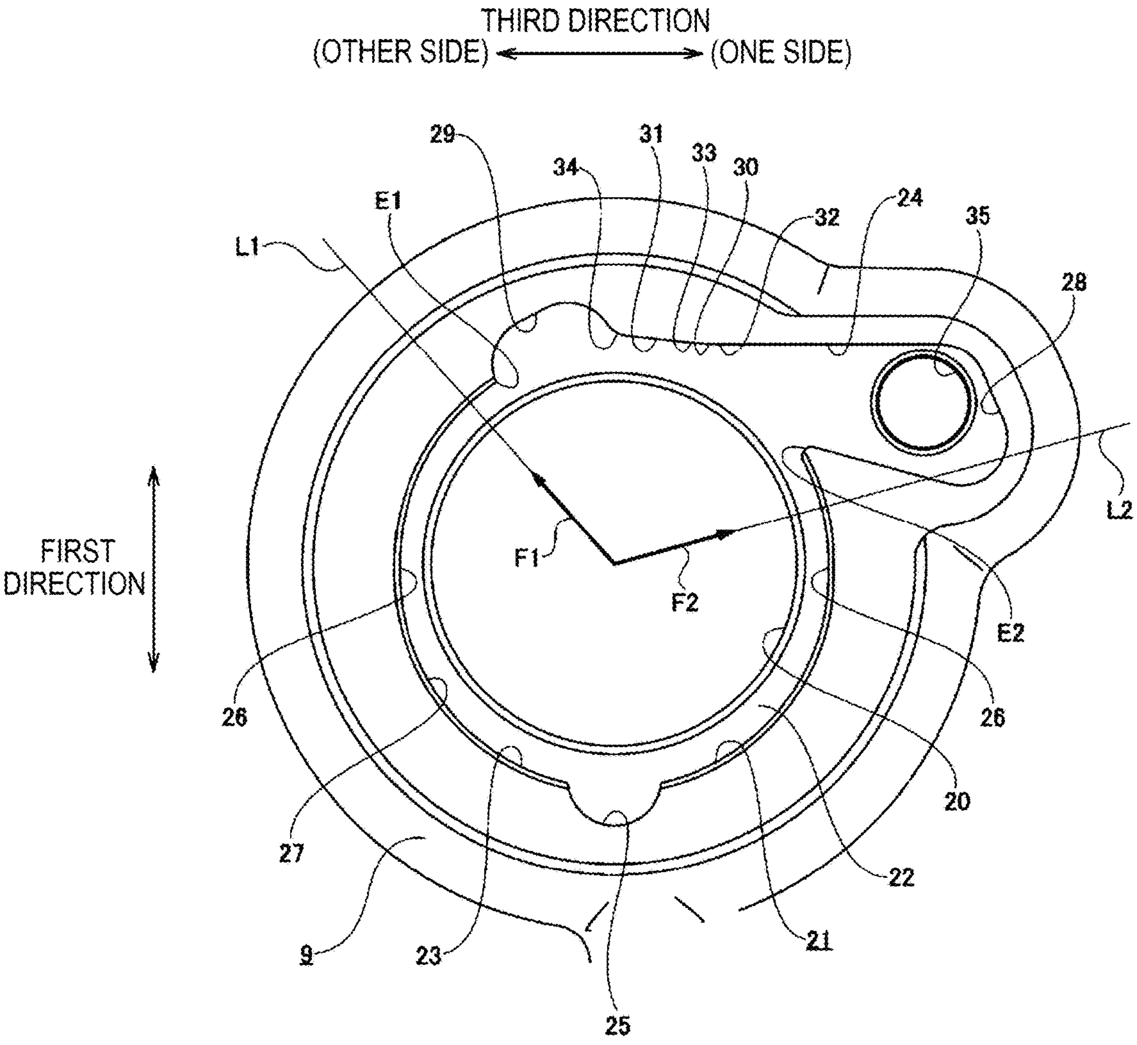
FIG. 8 is a view of a housing as viewed from the right side of FIG. 3 in the first example.
Figure 9:
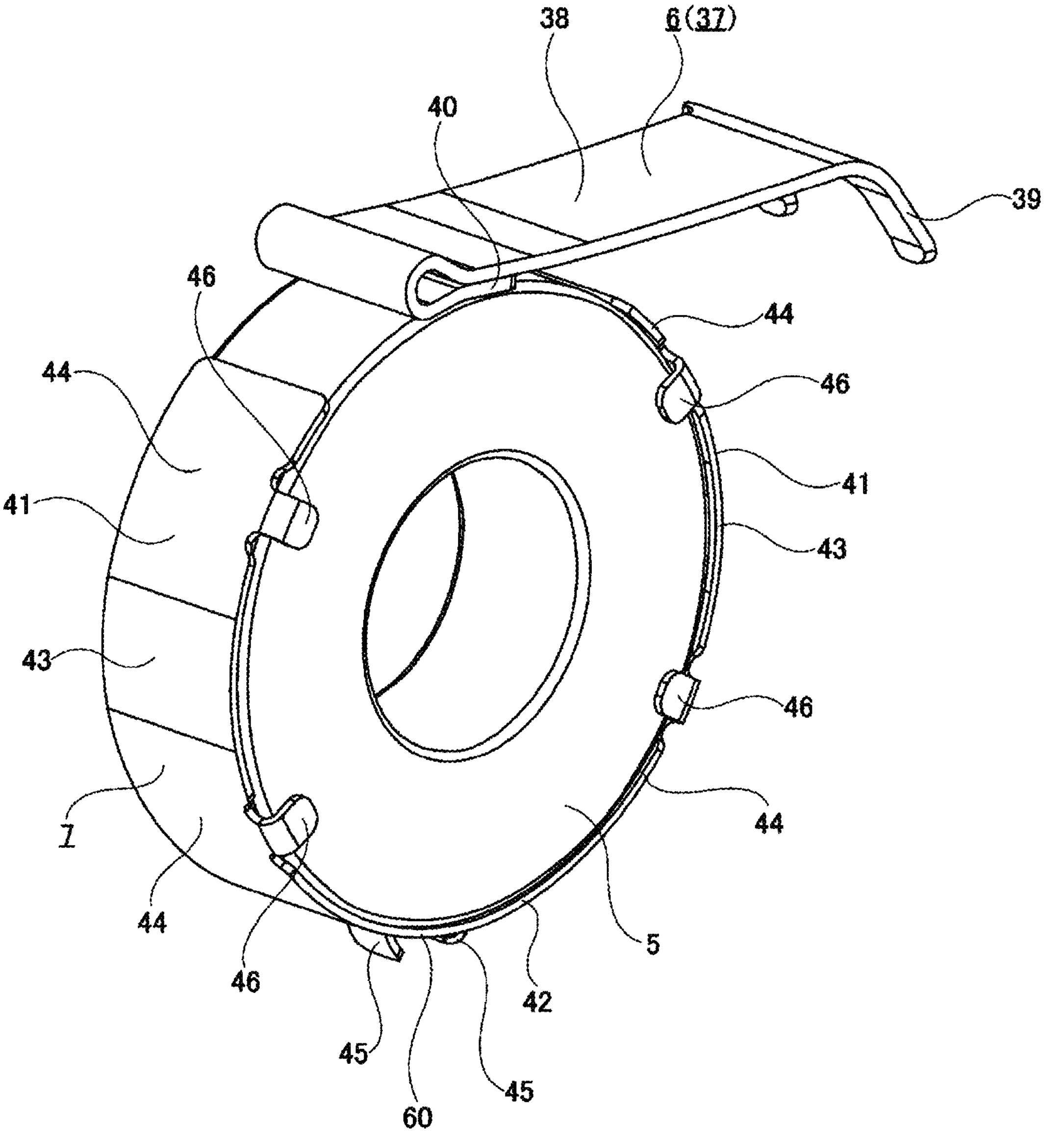
FIG. 9 is an extracted perspective view of a support bearing, an elastic urging portion, and an elastic clamping portion in the first example.
Figure 10:
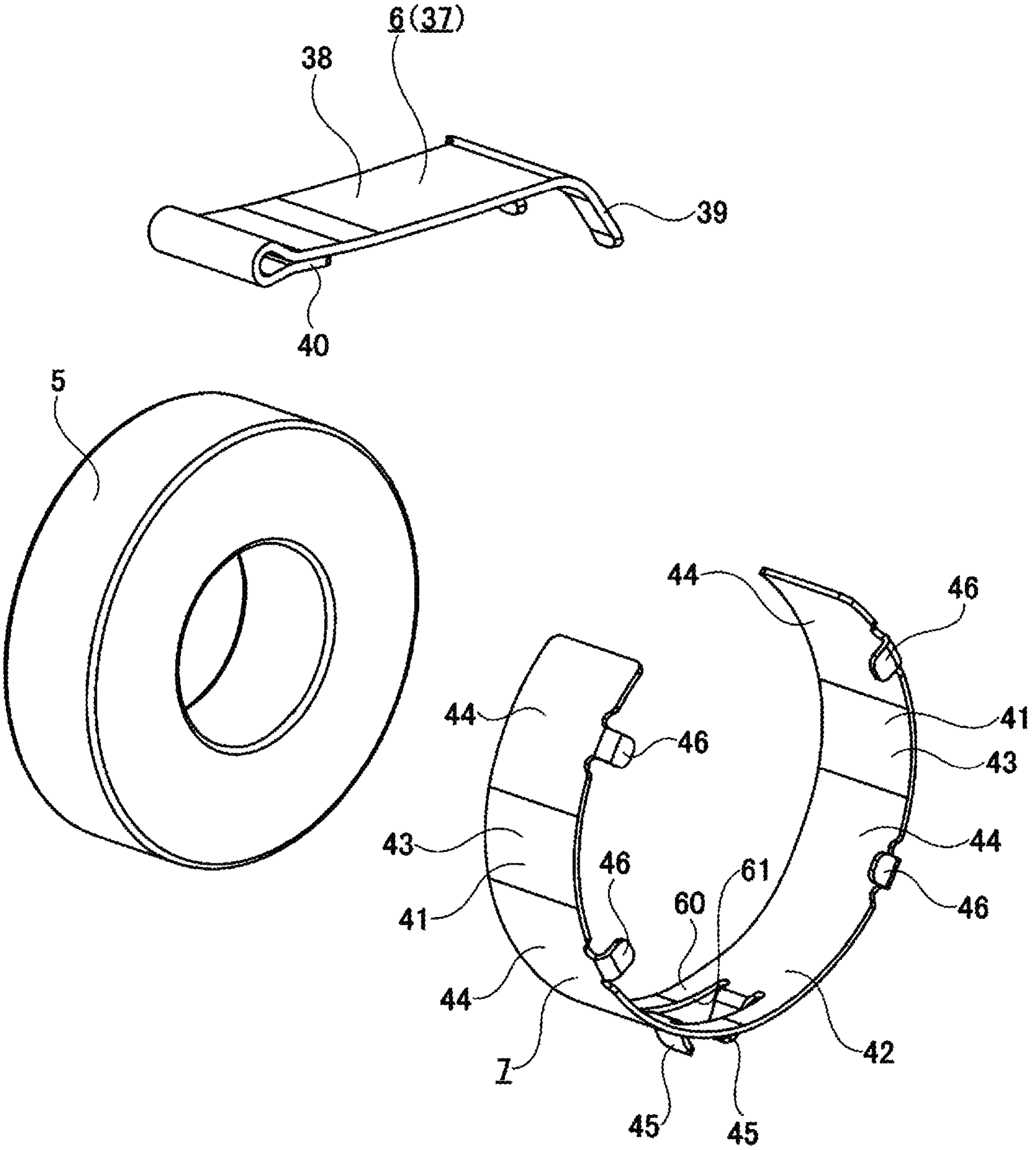
FIG. 10 is an exploded view of the members shown in FIG. 9.
Figure 11B:
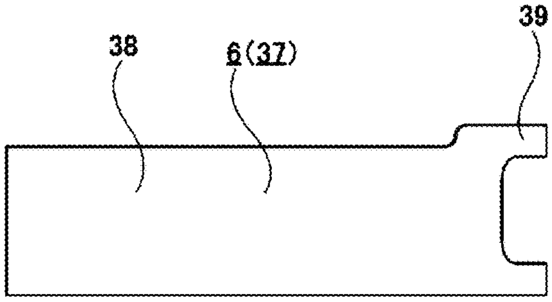
FIG. 11B is a view from an upper side of FIG. 11A.
Figure 11D:
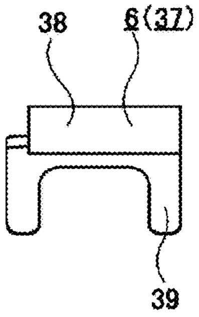
FIG. 11D is a view from a left side of FIG. 11A.
Figure 11A:
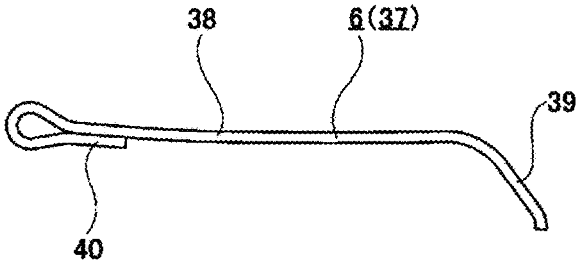
FIG. 11A is a side view of the elastic urging portion in the first example.
Figure 11E:
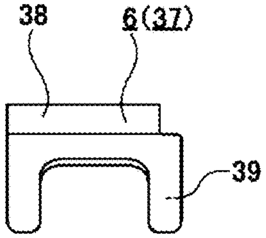
FIG. 11E is a view from a right side of FIG. 11A.
Figure 11C:
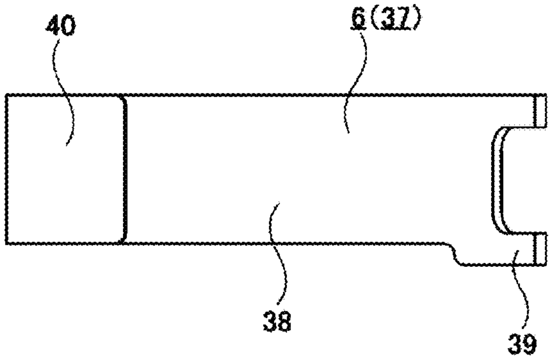
FIG. 11C is a view from a lower side of FIG. 11A.

As shown in FIGS. 5 and 8, the holding portion 21 of the worm accommodating portion 9 includes a main holding portion 23, a sub-holding portion 24, and a locking portion 25. The main holding portion 23 is disposed substantially coaxially with the small-diameter cylindrical surface portion 20, and has a substantially cylindrical shape that is slightly larger than the outer circumferential surface of the support bearing 5. The sub-holding portion 24 protrudes radially outward from an end portion of the main holding portion 23 on a side far from the worm wheel 3 in the first direction (upper side in FIGS. 5 and 8). The locking portion 25 protrudes radially outward from an end portion of the main holding portion 23 that is close to the worm wheel 3 in the first direction.

The main holding portion 23 is a portion on the inside of which the support bearing 5 is disposed so as to be movable in the radial direction. End portions on both sides of the main holding portion 23 in the third direction are respectively implemented by a pair of flat portions 26 (see FIG. 7) each extending in the first direction. The pair of flat portions 26 are portions with which intermediate portions of a pair of clamping plate springs 41 in a circumferential direction constituting the elastic clamping portion 7 are in contact. A distance between the pair of flat portions 26 in the third direction is larger than a diameter of the outer circumferential surface of the support bearing 5. The length of the pair of flat portions 26 in the first direction is ensured to be greater than the stroke amount by which the elastic clamping portion 7 can move in the first direction together with the tip end portion of the worm 4 and the support bearing 5 during operation. Accordingly, regardless of the movement of the elastic clamping portion 7 in the first direction, the pair of clamping plate springs 41 constituting the elastic clamping portion 7 are maintained in contact with the pair of flat portions 26.

A portion of the main holding portion 23 which is circumferentially deviated from the pair of flat portions 26 is implemented by a cylindrical surface portion 27 that is larger in diameter than the outer circumferential surface of the support bearing 5. When the present disclosure is carried out, the pair of flat portions of the main holding portion may be omitted, and the main holding portion may be implemented only by the cylindrical surface portion.

In the worm gear reducer 1 of this example, when torque is transmitted from the worm 4 to the worm wheel 3, a meshing reaction force is applied to the worm 4 from a meshing portion between the wheel teeth 12 and the worm teeth 13. The meshing reaction force includes not only a first-direction component but also a third-direction component. The third-direction component of the meshing reaction force has opposite directions between a case where the worm 4 rotates in a predetermined direction and a case where the worm 4 rotates in a direction opposite to the predetermined direction. A ratio of the first-direction component to the third-direction component included in the meshing reaction force differs between the case where the worm 4 rotates in the predetermined direction and the case where the worm 4 rotates in the opposite direction. That is, when the torque is transmitted between the worm 4 and the worm wheel 3, a meshing reaction force F1 or F2 as shown in FIG. 5 is applied to the tip end portion of the worm 4 depending on a rotational direction of the worm 4. The meshing reaction forces F1 and F2 are directed in directions asymmetric with each other with respect to the third direction. In this example, the thread direction of the worm teeth 13 is the right-hand thread direction, but when the thread direction of the worm teeth 13 is the left-hand thread direction, the direction of each of the meshing reaction forces F1 and F2 in FIG. 5 is a direction reversed in the third direction. In this case, the structure of the portion shown in FIG. 5 of this example can be reversed in the third direction, that is, reversed horizontally in FIG. 5.

As shown in FIG. 5, a circumferential range in which the cylindrical surface portion 27 of the main holding portion 23 is present includes the same circumferential position as vectors of the meshing reaction forces F1 and F2 when viewed from the second direction. That is, radiation straight lines L1 and L2 including the vectors of the meshing reaction forces F1 and F2 intersect a part of the cylindrical surface portion 27 of the main holding portion 23 in the circumferential direction.

Figure 6:
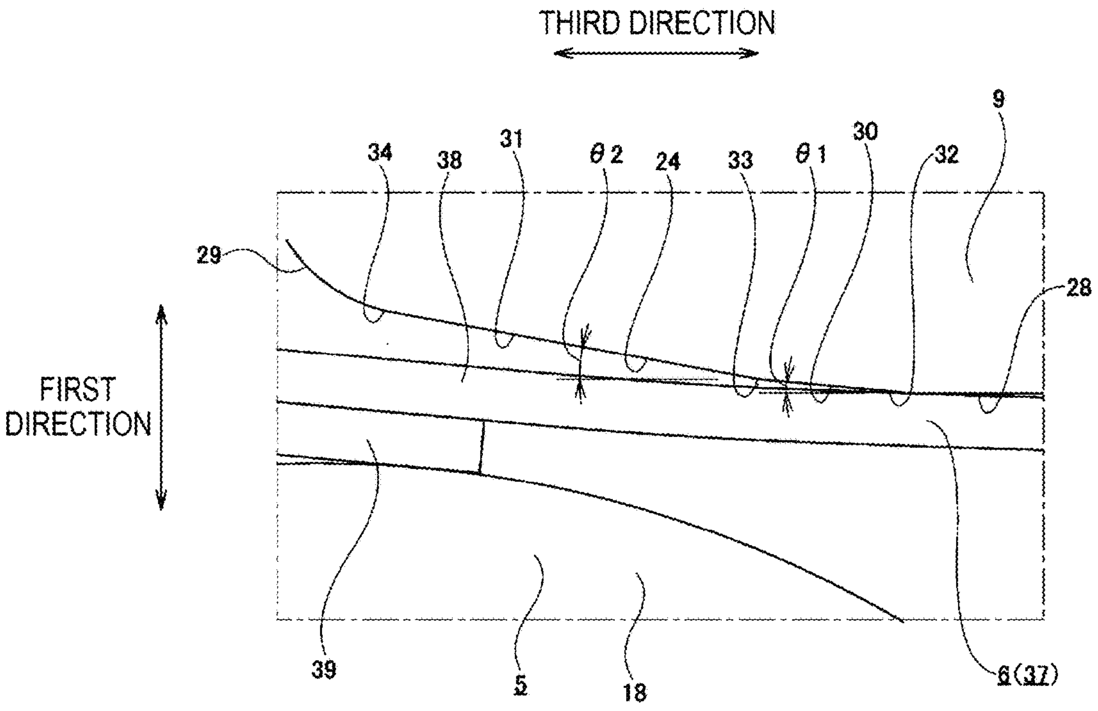
FIG. 6 is an enlarged view of part B in FIG. 5.
Figure 7:
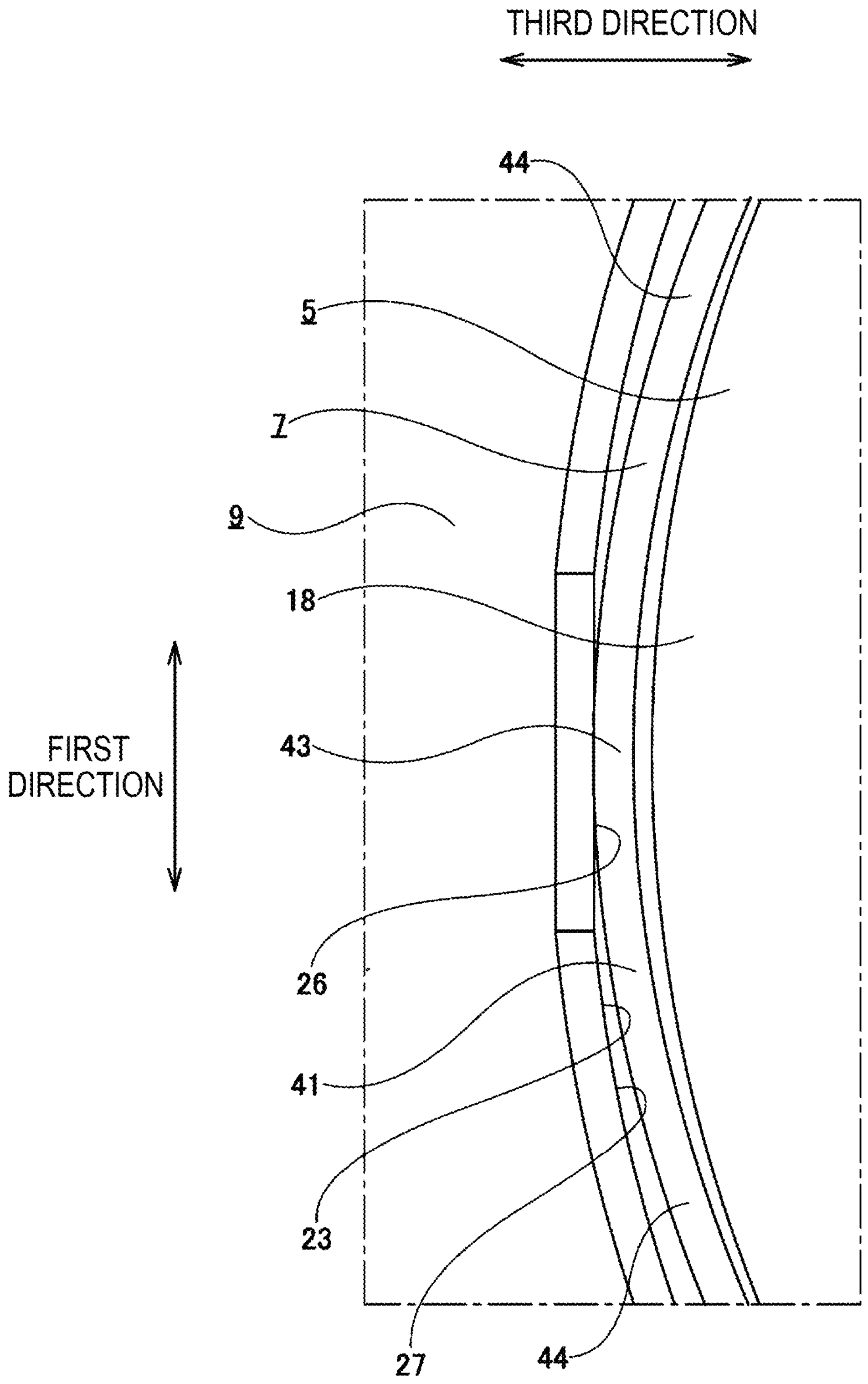
FIG. 7 is an enlarged view of part C in FIG. 5.

The sub-holding portion 24 is a portion on the inside of which the elastic urging portion 6 is disposed. The sub-holding portion 24 has a large recessed portion 28 recessed toward one side in the third direction on one side (right side in FIGS. 5 and 8) portion in the third direction. The sub-holding portion 24 has a small recessed portion 29 recessed toward a side far from the worm wheel 3 in the first direction on the other side (left side in FIGS. 5 and 8) portion in the third direction. The sub-holding portion 24 has a first inclined surface portion 30 and a second inclined surface portion 31 between the large recessed portion 28 and the small recessed portion 29 in order from a large recessed portion 28 side. Each of the first inclined surface portion 30 and the second inclined surface portion 31 is implemented by a flat surface inclined in a direction toward the side far from the worm wheel 3 in the first direction as it approaches the other side in the third direction. As shown in FIG. 6, an inclination angle θ2 of the second inclined surface portion 31 with respect to the third direction is larger than an inclination angle θ1 of the first inclined surface portion 30 with respect to the third direction (θ2>θ1). In this example, as viewed from the second direction, the length of the second inclined surface portion 31 is longer than the length of the first inclined surface portion 30. The large recessed portion 28 and the first inclined surface portion 30 are connected by the first corner portion 32. The first inclined surface portion 30 and the second inclined surface portion 31 are connected by the second corner portion 33. The second inclined surface portion 31 and the small recessed portion 29 are connected by a third corner portion 34. That is, the first corner portion 32, the second corner portion 33, and the third corner portion 34 are located in the order of the first corner portion 32, the second corner portion 33, and the third corner portion 34 in a direction away from a pin 36 disposed in the large recessed portion 28 in the third direction (left side in FIGS. 5, 6, and 8), and are located in the order of the first corner portion 32, the second corner portion 33, and the third corner portion 34 in a direction away from the worm wheel 3 in the first direction (upper side in FIGS. 5, 6, and 8). The first corner portion 32, the second corner portion 33, and the third corner portion 34 are portions with which the elastic urging portion 6 comes into contact during operation.

As shown in FIGS. 5 and 8, the locking portion 25 is a portion for engaging a portion of the elastic clamping portion 7 in the circumferential direction. In the illustrated example, the locking portion 25 is implemented by a semi-cylindrical concave surface.

In this example, the worm accommodating portion 9 has a recessed portion 35 that opens into a portion of the stepped surface 22 that is located inside the large recessed portion 28. The end portion of the columnar pin 36 extending in the second direction on the other side in the axial direction is press-fitted into and supported by the recessed portion 35. The pin 36 is a member used to hold the elastic urging portion 6.

The elastic urging portion 6 urges the support bearing 5 corresponding to an radially inner side member toward a worm wheel 3 side. Accordingly, the occurrence of tooth hitting sound is suppressed by suppressing the backlash between the wheel teeth 12 and the worm teeth 13. In the case of carrying out the present disclosure, an outer fitting member fitted around the support bearing 5 may be used as the radially inner side member. That is, the outer fitting member can be urged toward the worm wheel side by the elastic urging portion.

In this example, the elastic urging portion 6 exhibits a non-linear spring characteristic in which a spring constant increases as a deflection amount in the first direction increases in a state in which the elastic urging portion 6 is installed at a usage place.

Therefore, in this example, the elastic urging portion 6 has a configuration shown in FIGS. 11A to 11E, and uses a metal urging plate spring 37 installed as shown in FIG. 5.

As shown in FIGS. 11A to 11E, the urging plate spring 37 includes a rectangular plate-shaped band plate portion 38 having a large aspect ratio, a base plate portion 39 bent at an obtuse angle from an end edge portion on a proximal end side (right side in FIG. 11A) of the band plate portion 38 in a longitudinal direction to one side in a thickness direction (lower side in FIG. 11A), and a folded-back plate portion 40 folded back 180 degrees from an end edge portion on a tip end side (left side in FIG. 11A) of the band plate portion 38 in the longitudinal direction to the one side in the thickness direction, a tip end side portion thereof overlapping a tip end side portion of the band plate portion 38.

The entire urging plate spring 37 is disposed inside the worm accommodating portion 9. Specifically, as shown in FIG. 5, the urging plate spring 37 is disposed on the side far from the worm wheel 3 in the first direction in the portion between the outer circumferential surface of the support bearing 5 and the holding portion 21 provided on the inner circumferential surface of the worm accommodating portion 9 corresponding to an radially outer side member. More specifically, the urging plate spring 37 is disposed inside the sub-holding portion 24 constituting the holding portion 21. In the case of carrying out the present disclosure, an inner fitting member fitted into the worm accommodating portion may be used as the radially outer side member. That is, the holding portion 21 may be provided on the inner circumferential surface of the inner fitting member.

In this example, the urging plate spring 37 is installed at the use place, and is disposed as follows relative to surrounding portions when the worm gear reducer 1 is in an unloaded state, that is, when the torque transmitted from the worm 4 to the worm wheel 3 is zero and the meshing reaction forces F1 and F2 applied to the tip end portion of the worm 4 are zero.

A proximal end portion of the base plate portion 39 is elastically in contact with a bottom portion of the large recessed portion 28 constituting the sub-holding portion 24. A concave side surface (lower side surface in FIG. 5), which is one side surface in the thickness direction of a connection portion between the band plate portion 38 and the base plate portion 39, is elastically in contact with the outer circumferential surface of the pin 36. The other side surface (upper side surface in FIG. 5) in the thickness direction of the intermediate portion of the band plate portion 38 is elastically in contact with the first corner portion 32 constituting the sub-holding portion 24. One side surface (lower side surface in FIG. 5) in the thickness direction of a tip end portion of the folded-back plate portion 40 is elastically in contact with an end portion, of the outer circumferential surface of the support bearing 5, on the side far from the worm wheel 3 in the first direction. The band plate portion 38 is not in contact with the second corner portion 33 or the third corner portion 34, and a gap is present between the band plate portion 38 and the second corner portion 33 and between the band plate portion 38 and the third corner portion 34.

Figure 13A:
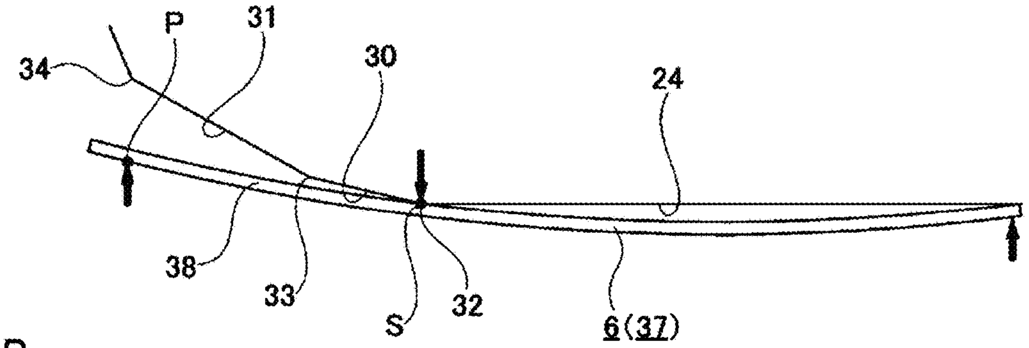
FIGS. 13A to 13D are diagrams schematically showing a state in which a deflection amount in a first direction of the elastic urging portion in the first example increases.

In this state, the urging plate spring 37 elastically urges the support bearing 5 toward a worm wheel 3 side such that a contact portion with the first corner portion 32 serves as a fulcrum S and the contact portion with the outer circumferential surface of the support bearing 5 serves as a load point P (see FIG. 13A). In this example, the urging plate spring 37 is held at the use place by a frictional force acting on a contact portion between the worm accommodating portion 9 and the pin 36. The load point P is disposed at substantially the same position as the third corner portion 34 of the sub-holding portion 24 in the third direction.

In this example, as the torque transmitted from the worm 4 to the worm wheel 3 increases, when the meshing reaction force F1 or F2 applied to the tip end portion of the worm 4 increases, a pressing force applied from the support bearing 5 to the load point P of the urging plate spring 37 increases, and the deflection amount of the urging plate spring 37 (band plate portion 38) in the first direction increases. FIGS. 13A to 13D are diagrams schematically showing how the deflection amount increases. In this example, when the deflection amount of the urging plate spring 37 in the first direction increases, an elastic contact position of the urging plate spring 37 with the sub-holding portion 24 changes as shown in the order of FIGS. 13A to 13D. That is, the position of the fulcrum S of the urging plate spring 37 changes in a stepwise manner in a direction approaching the load point P. Accordingly, the spring constant of the urging plate spring 37 increases stepwise as shown in FIG. 14 (conceptual diagram).

More specifically, in this example, when the deflection amount of the urging plate spring 37 in the first direction increases, the elastic contact position of the urging plate spring 37 with the sub-holding portion 24 changes from the first corner portion 32 (one place) shown in FIG. 13A to the first corner portion 32 and the second corner portion 33 (two places) shown in FIG. 13B, subsequently changes to the second corner portion 33 (one place) shown in FIG. 13C, and subsequently changes to the second corner portion 33 and the third corner portion 34 (two places) shown in FIG. 13D.

As shown in FIG. 13A, in a state in which the urging plate spring 37 is elastically in contact with only the first corner portion 32 (one place), the fulcrum S of the urging plate spring 37 becomes the contact portion with the first corner portion 32. The spring constant of the urging plate spring 37 in this state (first stage) is relatively small as shown in FIG. 14. In this example, during normal operation in which a large meshing reaction force does not act on the worm, the deflection amount of the urging plate spring 37 in the first direction is suppressed to be small, and the urging plate spring 37 is constantly in contact with the first corner portion 32.

Figure 13B:
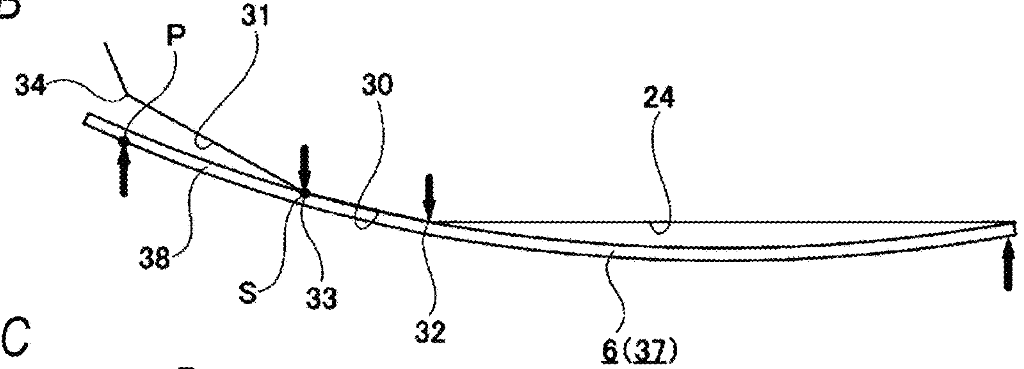
Figure 13C:
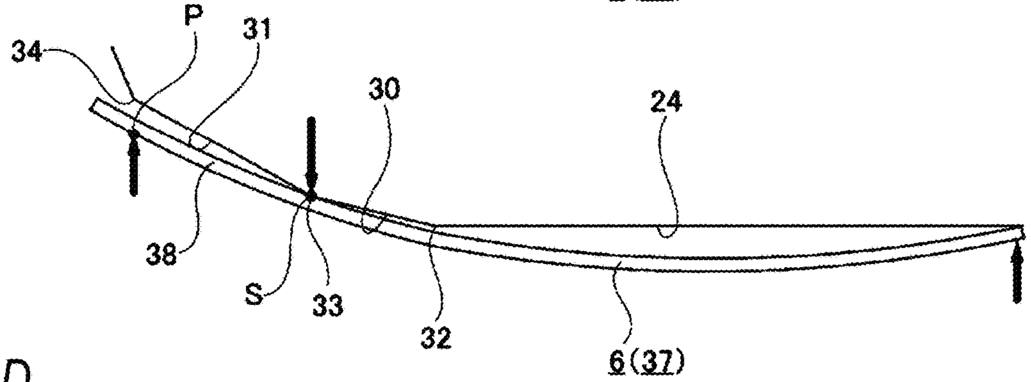
Figure 14:
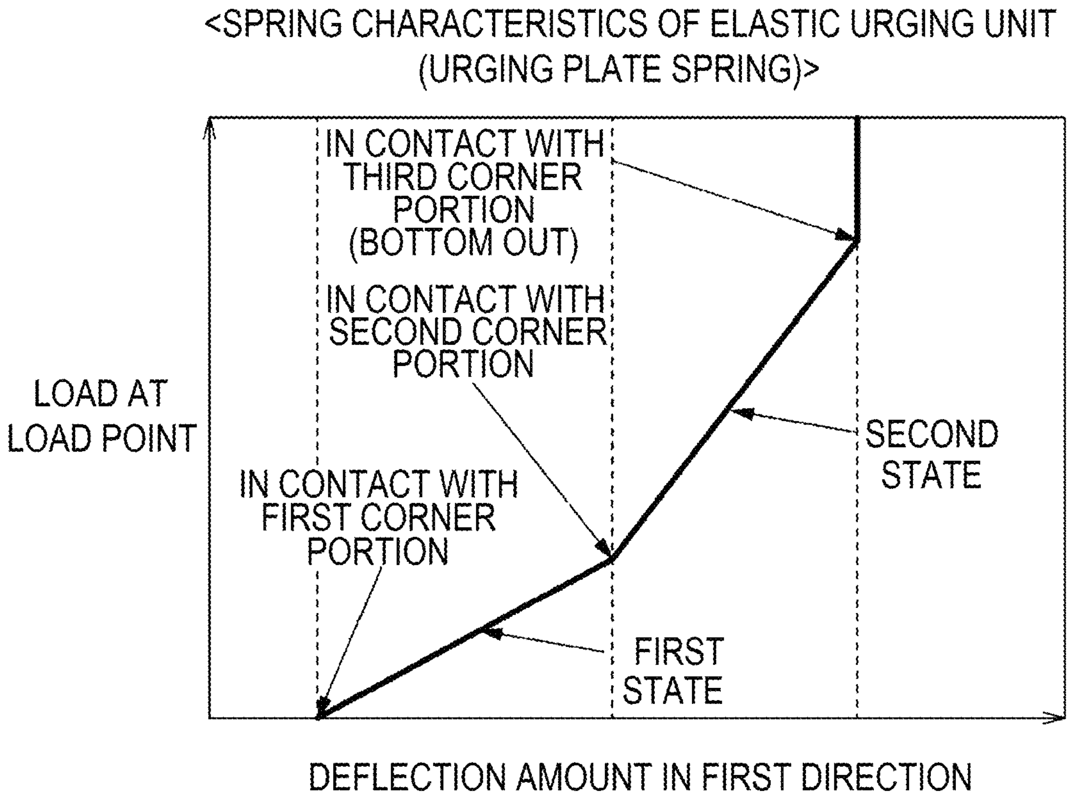
FIG. 14 is a line diagram (conceptual diagram) showing a spring characteristic of the elastic urging portion in the first example.

In a state in which the urging plate spring 37 is elastically in contact with the first corner portion 32 and the second corner portion 33 (two places) as shown in FIG. 13B and a state in which the urging plate spring 37 is elastically in contact with only the second corner portion 33 (one place) as shown in FIG. 13C, the fulcrum S of the urging plate spring 37 is a contact portion with the second corner portion 33. As shown in FIG. 14, the spring constant of the urging plate spring 37 in this state (second stage) becomes relatively large, and more specifically, becomes larger than that in the first stage.

Figure 13D:
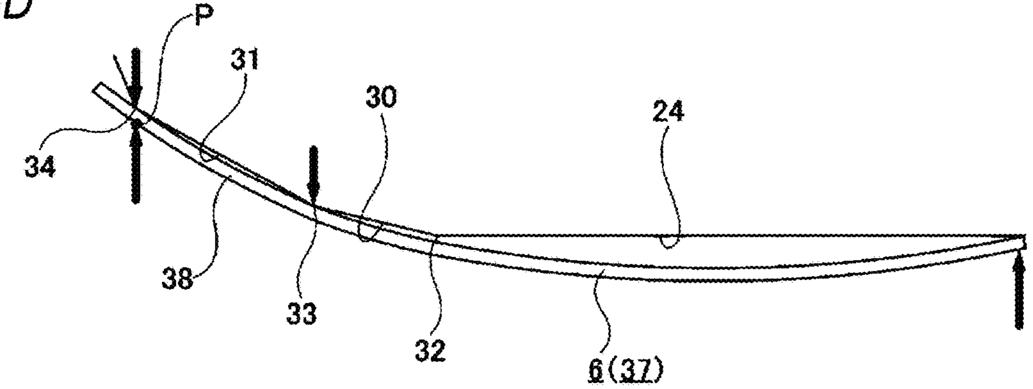

As shown in FIG. 13D, when the urging plate spring 37 is elastically in contact with the second corner portion 33 and the third corner portion 34 (two places), the urging plate spring 37 can no longer increase the deflection amount in the first direction and reaches a so-called bottom-out state.

That is, in this example, the spring constant of the urging plate spring 37 changes in two stages according to the deflection amount of the urging plate spring 37 in the first direction. Specifically, the spring constant of the urging plate spring 37 increases from a relatively small value (first stage) to a relatively large value (second stage) as the deflection amount of the urging plate spring 37 in the first direction increases.

Therefore, as the torque transmitted from the worm 4 to the worm wheel 3 increases, the deflection amount of the urging plate spring 37 in the first direction increases, and the spring constant of the urging plate spring 37 immediately before the urging plate spring 37 collides with the third corner portion 34 as shown in FIG. 13D can be set to a relatively large value (second stage). Therefore, the momentum of the collision can be efficiently suppressed by large elasticity of the urging plate spring 37. Accordingly, it is possible to efficiently suppress the occurrence of collision noise.

Further, by reversing the rotational direction of the worm 4 from the state shown in FIG. 13D, the spring constant of the urging plate spring 37 immediately before the deflection amount of the urging plate spring 37 in the first direction decreases to the state shown in FIG. 13A can be set to a relatively small value (first stage). Therefore, the momentum of the collision between the wheel teeth 12 and the worm teeth 13 caused by reversing the rotational direction of the worm 4 can be efficiently suppressed by reducing the urging force of the urging plate spring 37. Accordingly, it is possible to efficiently suppress the occurrence of the tooth hitting sound between the wheel teeth 12 and the worm teeth 13.

In this example, the corner portions, which serve as the fulcrum S of the urging plate spring 37, are the first corner portion 32 and the second corner portion 33. However, in the case of carrying out the present disclosure, the spring constant of the urging plate spring 37 can be changed in three stages or more by making the number of corner portions larger than in this example. Of the sub-holding portion 24, a portion with which the urging plate spring 37 is elastically in contact, for example, a portion located between the first corner portion 32 and the second corner portion 33, or a portion located between the second corner portion 33 and the third corner portion 34 may be a convex curved surface. With such a configuration, as the deflection amount of the urging plate spring 37 in the first direction increases, the urging plate spring 37 is curved along the convex curved surface. Therefore, the position of the fulcrum S of the urging plate spring 37 can be continuously changed in the direction approaching the load point P, and the spring constant of the urging plate spring 37 can be continuously increased.

In the case of carrying out the present disclosure, the spring characteristic of the elastic urging portion may be non-linear or linear. When the present disclosure is carried out, when a plate spring is used as the elastic urging portion, the plate spring may have a shape different from that of this example. In the case of carrying out the present disclosure, various springs other than the plate spring, such as a coil spring, or rubber, or the like may also be used as the elastic urging portion.

The elastic clamping portion 7 has the pair of clamping plate springs 41 disposed on both sides of the support bearing 5 in the third direction in a portion between the outer circumferential surface of the support bearing 5 corresponding to the radially inner side member and the holding portion 21 provided on the inner circumferential surface of the worm accommodating portion 9 corresponding to the radially outer side member. Each of the clamping plate springs 41 constituting the pair of clamping plate springs 41 exhibits a non-linear spring characteristic in which the spring constant increases as a deflection amount in a direction including the third-direction component (in this example, the deflection amount in the third direction) increases.

Figures 12A, 12B, 12C, 12D, 12E:
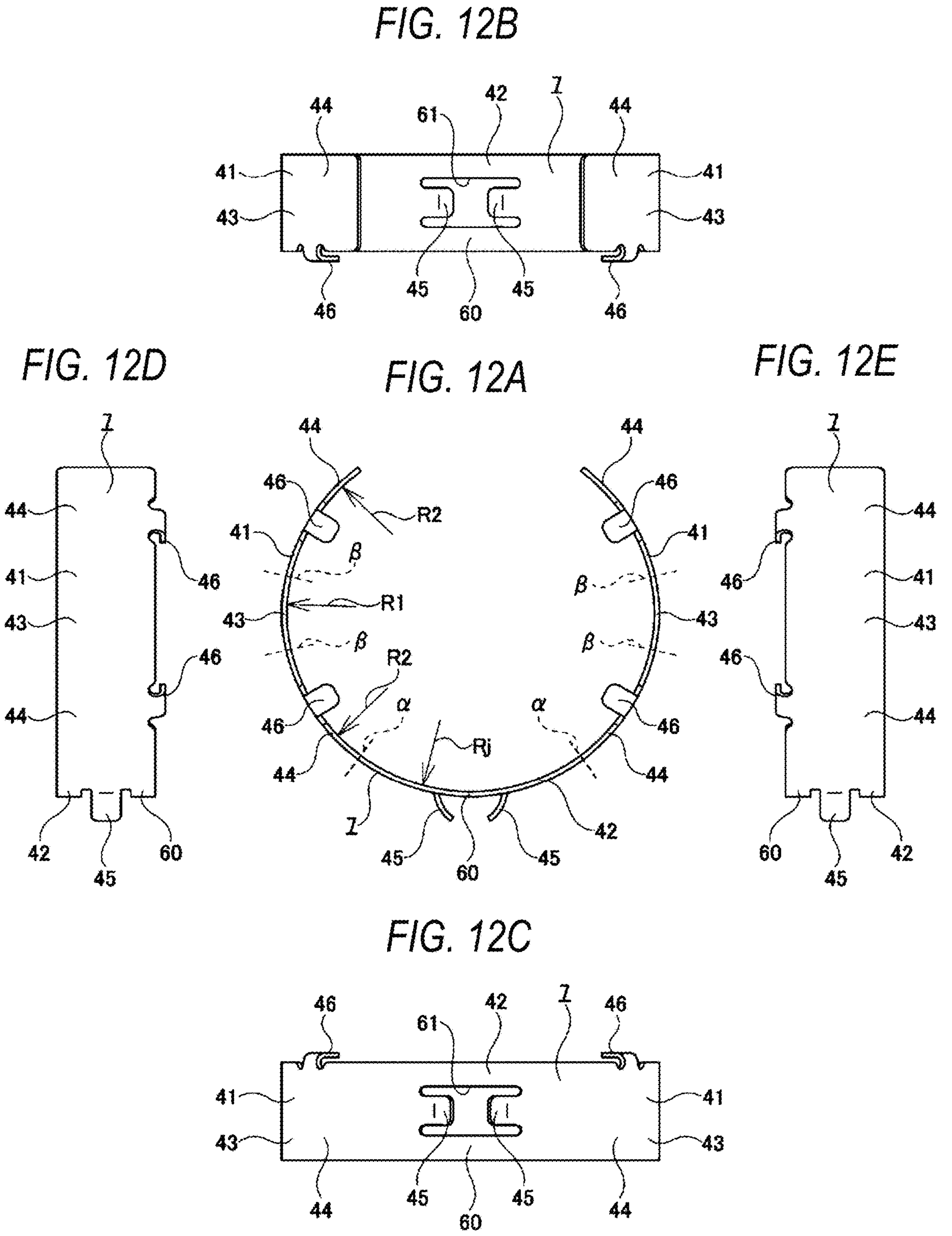
FIG. 12A is a side view of the elastic clamping portion in the first example.
FIG. 12B is a view from an upper side of FIG. 12A.
FIG. 12C is a view from a lower side of FIG. 12A.
FIG. 12D is a view from a left side of FIG. 12A.
FIG. 12E is a view from a right side of FIG. 12A.

In this example, as shown in FIGS. 12A to 12E, the elastic clamping portion 7 is implemented by a metal plate spring having a partially cut-out cylindrical shape (C shape) as a whole. The pair of clamping plate springs 41 constitute both side portions of the elastic clamping portion 7 in the circumferential direction. The elastic clamping portion 7 has a circumferential connection portion 42 that connects circumferential end portions of the pair of clamping plate springs 41 that are close to the worm wheel 3 to each other in the circumferential direction. In FIG. 12A, a broken line α indicates a boundary line between the pair of clamping plate springs 41 and the circumferential connection portion 42.

In this example, each of the clamping plate springs 41 constituting the pair of clamping plate springs 41 has a first portion 43 constituting the intermediate portion in the circumferential direction and a second portion 44 constituting both the side portions in the circumferential direction. In FIG. 12A, a broken line β indicates a boundary line between the first portion 43 and the second portion 44.

The first portion 43 has a partial cylindrical shape curved along the outer circumferential surface of the support bearing 5. Each of the second portions 44 has a partial cylindrical shape curved along the outer circumferential surface of the support bearing 5, and is smoothly continuous with the first portion 43. That is, when viewed from the axial direction of the worm 4, the first portion 43 and the second portion 44 are connected such that circumferential end portions of radially inner surfaces thereof have a common tangent line, and are connected such that circumferential end portions of radially outer surfaces thereof have a common tangent line.

A curvature radius R1 of the radially inner surface of the first portion 43 in a free state is smaller than a curvature radius Rs of the outer circumferential surface of the support bearing 5 (see FIG. 5) ($R1<Rs$). A curvature radius R2 of the radially inner surface of the second portion 44 in the free state is larger than the curvature radius R1 of the radially inner surface of the first portion 43 in the free state ($R2>R1$). In this example, the curvature radius R2 is equal to the curvature radius Rs of the outer circumferential surface of the support bearing 5 ($R2=Rs$). However, in the case of carrying out the present disclosure, the curvature radius R2 may be made slightly larger or smaller than the curvature radius Rs.

In this example, for each of the clamping plate springs 41 constituting the pair of clamping plate springs 41, a residual stress is applied to the first portion 43 corresponding to a portion that is in contact with the holding portion 21 provided on the inner circumferential surface of the worm accommodating portion 9. Accordingly, it is easier to ensure durability of the first portion 43 in which the amount of elastic deformation during operation is likely to be larger than that of other portions. When the present disclosure is carried out, the application of the residual stress may be omitted.

The circumferential connection portion 42 has a partial cylindrical shape curved along the outer circumferential surface of the support bearing 5, and is smoothly continuous with each of the clamping plate springs 41 constituting the pair of clamping plate springs 41. That is, when viewed from the axial direction of the worm 4, the clamping plate spring 41 and the circumferential connection portion 42 are connected such that circumferential end portions of radially inner surfaces thereof have a common tangent line, and are connected such that circumferential end portions of radially outer surfaces thereof have a common tangent line. In this example, a curvature radius Rj of the radially inner surface of the circumferential connection portion 42 in the free state is equal to the curvature radius R2 of the radially inner surface of the second portion 44 in the free state (Rj=R2). In the case of carrying out the present disclosure, the circumferential connection portions may be omitted, that is, the pair of clamping plate springs 41 may be separated from each other.

In this example, the elastic clamping portion 7 has circumferential position positioning pieces 45 engaged with the worm accommodating portion 9 in the circumferential direction.

In this example, two circumferential position positioning pieces 45 are provided at the intermediate portion of the circumferential connection portion 42 in the circumferential direction so as to be separated in the circumferential direction. The two circumferential position positioning pieces 45 are provided to protrude outward in the radial direction from the intermediate portion of the circumferential connection portion 42 in the circumferential direction. More specifically, the two circumferential position positioning pieces 45 are formed by bending a pair of tongue pieces provided by forming an H-shaped through hole in the intermediate portion of the circumferential connection portion 42 in the circumferential direction outward in the radial direction. The circumferential position positioning pieces 45 are portions for determining the position of the elastic clamping portion 7 in the circumferential direction and stopping the rotation by engaging with the locking portion 25 of the holding portion 21 in the circumferential direction.

Note that, in the case of carrying out the present disclosure, when the circumferential position positioning pieces are provided, the shape, the number, the circumferential position, or the like of the circumferential position positioning pieces may be different from those in this example. Further, the circumferential position positioning pieces may be provided to be engaged with the radially inner side member, which is the support bearing or the outer fitting member fitted around the support bearing in the circumferential direction.

In this example, the circumferential connection portion 42 has, on the intermediate portion in the circumferential direction, specifically, in a portion between the two circumferential position positioning pieces 45, a low-rigidity connection portion 60 that is lower in rigidity than both the side portions of the circumferential connection portion 42 in the circumferential direction, which are the remainder in the circumferential direction, and the pair of clamping plate springs 41. In this example, in order to reduce the rigidity of the low-rigidity connection portion 60, a rectangular through hole 61 is formed in a circumferential portion where the low-rigidity connection portion 60 is located, thereby reducing a cross-sectional coefficient of the circumferential portion. The low-rigidity connection portion 60 is provided to reduce the interaction between the pair of clamping plate springs 41 by decreasing deflection resistance of the low-rigidity connection portion 60. In the case of carrying out the present disclosure, a low-rigidity portion may be provided in at least a part of the circumferential connection portion in the circumferential direction. The provision of the low-rigidity portion in the circumferential connection portion may be omitted.

In the case of carrying out the present disclosure, portions different from those in this example, such as portions reducing the plate thickness of the low-rigidity portion, may be adopted as portions for reducing the rigidity of the low-rigidity portion.

In this example, the elastic clamping portion 7 has axial position positioning pieces 46 engaged with the support bearing 5 in the axial direction.

In this example, two axial position positioning pieces 46 are provided on each of the clamping plate springs 41 constituting the pair of clamping plate springs 41 so as to be separated from each other in the circumferential direction. More specifically, the axial position positioning piece 46 is provided to be bent inward in the radial direction from the end portion at one side in the axial direction of the intermediate portion of the second portion 44 in the circumferential direction.

Note that, in the case of carrying out the present disclosure, when the axial position positioning pieces are provided, the shape, the number, the circumferential position, the axial position, or the like of the axial position positioning pieces may be different from those in this example. Further, the axial position positioning piece may be provided to be engaged with the radially inner side member, which is the worm accommodating portion or the inner fitting member fitted inside the worm accommodating portion in the axial direction.

As shown in FIG. 5, the elastic clamping portion 7 is disposed in a portion between the outer circumferential surface of the support bearing 5 and the holding portion 21 provided on the inner circumferential surface of the worm accommodating portion 9. Specifically, the elastic clamping portion 7 is fitted around the support bearing 5 and disposed inside the main holding portion 23 constituting the holding portion 21.

In this state, the two circumferential position positioning pieces 45 provided in the elastic clamping portion 7 are disposed inside the locking portion 25 constituting the holding portion 21, and are engaged with the locking portions 25 in the circumferential direction. Accordingly, when the elastic clamping portion 7 is positioned in the circumferential direction, the pair of clamping plate springs 41 constituting the elastic clamping portion 7 are disposed on both sides in the third direction of the portion between the outer circumferential surface of the support bearing 5 and the main holding portion 23. In this example, a gap in the first direction and a gap in the third direction are provided between the two circumferential position positioning pieces 45 and the locking portion 25. Accordingly, it is possible to allow slight displacement in the first direction and the third direction of the two circumferential position positioning pieces 45 with respect to the locking portion 25, which is required during operation. In this example, a first direction dimension of the two circumferential position positioning pieces 45 is set such that the amount of intrusion of the two circumferential position positioning pieces 45 with respect to the locking portion 25 in the first direction is sufficiently secured regardless of the movement of the elastic clamping portion 7 in the first direction together with the tip end portion of the worm 4 and the support bearing 5 during operation.

Each of the axial position positioning pieces 46 provided in the elastic clamping portion 7 is engaged with the outer ring 18 in the axial direction by being in contact with a side surface on one side of the outer ring 18 in the axial direction of the support bearing 5. Accordingly, the elastic clamping portion 7 is positioned axially relative to the support bearing 5.

In this example, the first portion 43 (more specifically, a central portion of the first portion 43 in the circumferential direction) that is the intermediate portion of each of the clamping plate springs 41 in the circumferential direction constituting the pair of clamping plate springs 41 intersects a third direction straight line Lx that is a straight line that passes through an center O4 of the worm 4 and extends in the third direction when viewed from the second direction.

More specifically, each of the clamping plate springs 41 constituting the pair of clamping plate springs 41 is disposed as follows relative to the surrounding portions when the meshing reaction forces F1 and F2 are zero.

Figure 15C:
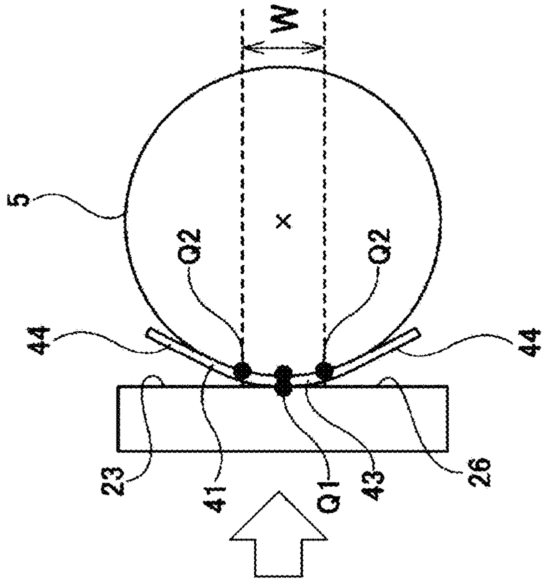
FIGS. 15A to 15C are diagrams schematically showing a state in which a deflection amount in a third direction of the elastic clamping portion (clamping plate spring) in the first example increases.
Figure 15B:
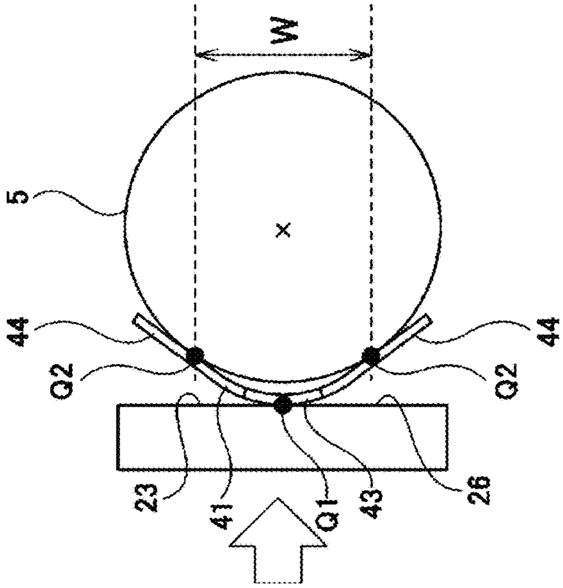
Figure 15A:
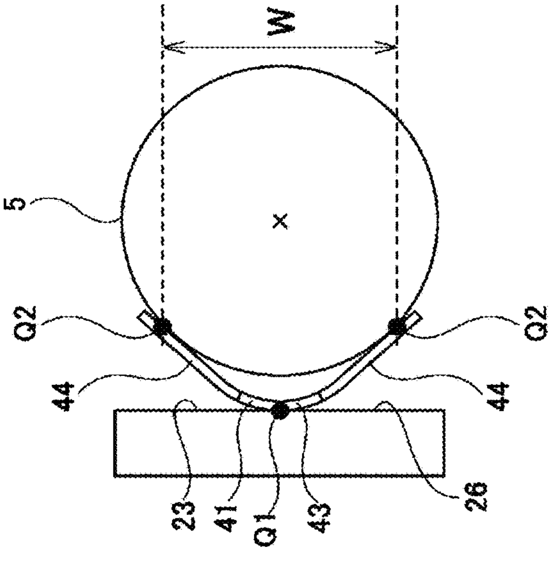

The central portion of the radially outer surface of the first portion 43 in the circumferential direction is in contact with the flat portion 26 constituting the main holding portion 23 at a point Q1 shown in FIG. 15A. An end portion of each of the second portions 44 on the circumferential outer side on the radially inner surface, that is, an end portion of the second portion 44 on a side far from the first portion 43 in the circumferential direction is in contact with the outer circumferential surface of the support bearing 5 at a point Q2 shown in FIG. 15A. The radially inner surface of the first portion 43 is not in contact with the outer circumferential surface of the support bearing 5, and a gap is present between the radially inner surface of the first portion 43 and the outer circumferential surface of the support bearing 5. The radially outer surface of each of the second portions 44 is not in contact with the main holding portion 23, and a gap is present between the radially outer surface of each of the second portions 44 and the main holding portion 23. That is, the clamping plate spring 41 is in contact with the main holding portion 23 at only one place (point Q1 shown in FIG. 15A), and is in contact with the outer circumferential surface of the support bearing 5 at only two places (points Q2 shown in FIG. 15A). When the meshing reaction forces F1 and F2 are zero, initial deflection in the third direction occurs in each of the clamping plate springs 41 constituting the pair of clamping plate springs 41. Thus, even when the meshing reaction forces F1 and F2 are zero, the support bearing 5 is prevented from rattling in the third direction inside the main holding portion 23. However, from the viewpoint of suppressing a frictional force of the pair of clamping plate springs 41 with respect to the flat portion 26 when the meshing reaction forces F1 and F2 are zero, the initial deflection in the third direction is preferably set as small as possible.

The second portion 44 on the side far from the worm wheel 3 of one clamping plate spring 41 located on the other side (left side in FIG. 5) in the third direction, of the pair of clamping plate springs 41, intersects the radiation straight line L1 including the vector of the meshing reaction force F1 as viewed from the second direction. The second portion 44 on the side far from the worm wheel 3 of the other clamping plate spring 41 located on one side (right side in FIG. 5) in the third direction, of the pair of clamping plate springs 41, intersects the radiation straight line L2 including the vector of the meshing reaction force F2 as viewed from the second direction.

In the above state, the elastic clamping portion 7 clamps the support bearing 5 from both sides in the third direction by the pair of clamping plate springs 41. Accordingly, the occurrence of abnormal noise is suppressed by suppressing the momentum when the tip end portion of the worm 4 moves in the third direction.

That is, in the structure of this example, in order to enable the tip end portion of the worm 4 to move toward and away from the worm wheel 3 in the first direction, the main holding portion 23 disposed around the support bearing 5 is formed to be slightly larger than the outer circumferential surface of the support bearing 5. Therefore, the tip end portion of the worm 4 can also move in the third direction.

On the other hand, the meshing reaction forces F1 and F2 acting on the worm 4 include not only a force of the first-direction component but also a force of the third-direction component. The direction of the third-direction component is reversed according to the rotational direction of the worm 4. Further, during operation of a mechanical device (in this example, an automobile) in which the worm gear reducer 1 of this example is incorporated, when vibration is reversely input from a portion (in this example, a tire) located on downstream of the worm gear reducer 1 in a transmission direction of power to the worm gear reducer 1, a third-direction component of the vibration is transmitted to the worm 4. Therefore, when the tip end portion of the worm 4 is allowed to move in the third direction without resistance, the outer circumferential surface of the support bearing 5 forcefully collides with the main holding portion 23 in the third direction by the third-direction component of the meshing reaction forces F1 and F2 acting on the worm 4 and the third-direction component of the vibration reversely input to the worm 4, and abnormal noise such as harsh hitting sound or rattling noise is likely to occur.

In the structure of this example, in order to suppress the abnormal noise, the support bearing 5 is clamped from both sides in the third direction by the pair of clamping plate springs 41 constituting the elastic clamping portion 7. Accordingly, the occurrence of the abnormal noise is suppressed by suppressing the momentum when the tip end portion of the worm 4 moves in the third direction.

In this example, as the torque transmitted from the worm 4 to the worm wheel 3 increases, when the meshing reaction force F1 applied to the tip end portion of the worm 4 or F2 increases, a pressing force in the third direction acting on the clamping plate spring 41 located on one side (left side in FIG. 5) and the other side (the right side in FIG. 5) in the third direction from the support bearing 5 increases. Accordingly, the deflection amount of the clamping plate spring 41 in the third direction increases. FIGS. 15A to 15C are diagrams schematically showing how the deflection amount increases.

Figure 16:
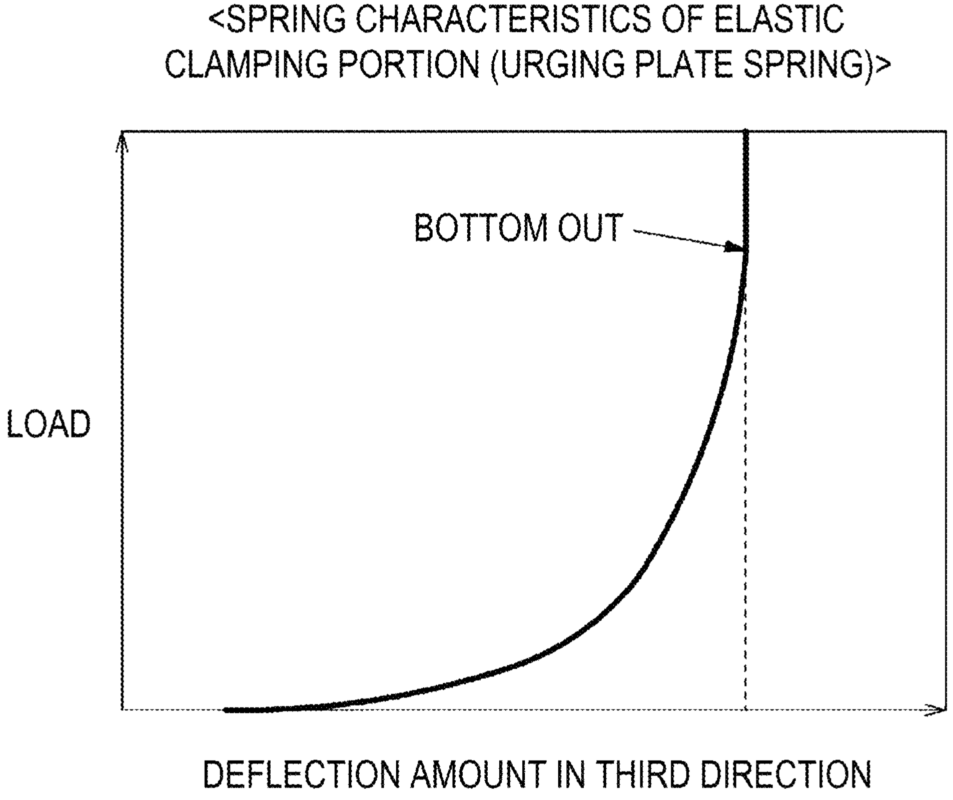
FIG. 16 is a line diagram (conceptual diagram) showing a spring characteristic of the elastic clamping portion (clamping plate spring) in the first example.

In this example, as the deflection amount of the clamping plate spring 41 in the third direction increases, a distance W in the first direction between the contact portions (point Q2) of the radially inner surfaces of the two second portions 44 facing the outer circumferential surface of the support bearing 5 decreases continuously as shown in the order of FIGS. 15A to 15C. As shown in FIG. 15C, when the first portion 43 of the clamping plate spring 41 is sandwiched between the flat portion 26 of the main holding portion 23 and the outer circumferential surface of the support bearing 5, the clamping plate spring 41 can no longer increase the deflection amount in the third direction and reaches a so-called bottom-out state. That is, in this example, the distance W continuously decreases as the deflection amount of the clamping plate spring 41 in the third direction increases until the clamping plate spring 41 reaches the bottom-out state, so that the spring constant of the clamping plate spring 41 increases continuously as shown in FIG. 16

(conceptual diagram). That is, as described above, the clamping plate spring 41 exhibits a non-linear spring characteristic in which a spring constant increases as the deflection amount in the third direction increases. In particular, in the example of FIG. 16, when the horizontal axis represents the deflection amount in the third direction and the vertical axis represents the load, a graph representing the non-linear spring characteristic is downwardly convex, with a slope increasing as the deflection amount in the third direction increases. The spring characteristic is not limited to the example of FIG. 16, and any non-linear characteristics can be applied. For example, the spring characteristic may be represented by a graph in which the slope decreases as the deflection amount in the third direction increases. Further, the spring characteristic may be represented by a graph obtained by combining a plurality of curves and/or straight lines.

Therefore, in the structure of this example, urging operation of the tip end portion of the worm 4 and the support bearing 5 by the urging plate spring 37 can be made smooth, and momentum of the collision between the members in the third direction can be easily suppressed around the tip end portion of the worm 4.

That is, since the spring constant of the clamping plate spring 41 decreases in a stage where the deflection amount in the third direction is small (low load region), in this stage, the frictional force acting between the clamping plate spring 41 and the flat portion 26 of the main holding portion 23 and the frictional force acting between the clamping plate spring 41 and the outer circumferential surface of the support bearing 5 decrease. Therefore, the tip end portion of the worm 4 and the support bearing 5 can be smoothly moved in the first direction. Therefore, the urging operation of the tip end portion of the worm 4 and the support bearing 5 by the urging plate spring 37 can be made smooth.

On the other hand, since the spring constant of the clamping plate spring 41 increases in the stage where the deflection amount in the third direction is large (high load region), the momentum of the movement of the support bearing 5 in the third direction immediately before the bottom-out state shown in FIG. 15C can be efficiently suppressed by large elasticity of the clamping plate spring 41. Accordingly, it is possible to efficiently suppress the occurrence of the collision noise at the time of the bottom-out.

Further, by reversing the rotational direction of the worm 4 from the state shown in FIG. 15C, the spring constant of the clamping plate spring 41 immediately before the deflection amount of the clamping plate spring 41 in the third direction decreases to the state shown in FIG. 15A can be decreased. Therefore, the momentum of the collision between the wheel teeth 12 and the worm teeth 13 caused by reversing the rotational direction of the worm 4 can be efficiently suppressed by reducing the urging force of the clamping plate spring 41. Accordingly, it is possible to efficiently suppress the occurrence of the tooth hitting sound between the wheel teeth 12 and the worm teeth 13.

In this example, the curvature radius of the radially inner surface of the second portion 44 forming both the side portions of the clamping plate spring 41 in the circumferential direction is set to a constant value, but when implementing the present disclosure, the curvature radius of the radially inner surface of the second portion may be changed stepwise or continuously in the circumferential direction.

Figures 17A, 17B, 17C:
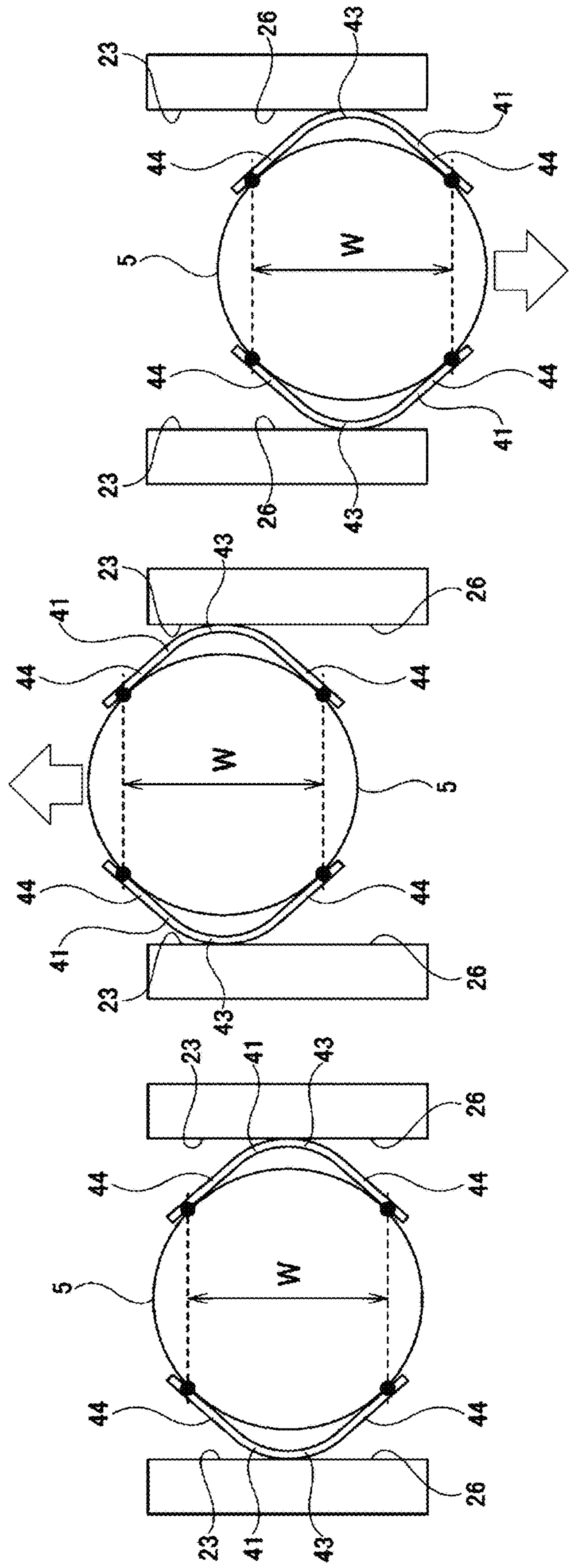
FIGS. 17A to 17C are diagrams schematically showing a state in which the deflection amount in the third direction of the elastic clamping portion (clamping plate spring) in the first example does not change with the movement in the first direction.

In this example, a portion of the main holding portion 23 with which each of the clamping plate springs 41 constituting the pair of clamping plate springs 41 is elastically in contact with is implemented by the flat portion 26 extending in the first direction. Therefore, as shown in FIGS. 17A to 17C, even when the elastic clamping portion 7 moves in the first direction, the deflection amount of the pair of clamping plate springs 41 in the third direction, that is, the distance W does not change, and the spring constant of each of the clamping plate springs 41 constituting the pair of clamping plate springs 41 can be kept constant. Therefore, it is possible to ensure the stable spring characteristic for the elastic urging portion 6 and the elastic clamping portion 7. Note that, in the case of carrying out the present disclosure, the length of the pair of flat portions 26 in the first direction may be made smaller than the stroke amount by which the elastic clamping portion 7 can move in the first direction together with the tip end portion of the worm 4 and the support bearing 5 during operation, that is, when the large meshing reaction force is applied to the worm 4, the elastic contact portion of the clamping plate spring 41 with the main holding portion 23 may ride up from the flat portion 26 to the cylindrical surface portion 27. Even in this case, while the contact portion is present in the flat portion 26, the spring constant of the clamping plate spring 41 can be kept constant.

In this example, when viewed from the second direction, the radiation straight lines L1 and L2 including the vectors of the meshing reaction forces F1 and F2 intersect the part of the cylindrical surface portion 27 of the main holding portion 23 in the circumferential direction. The second portion 44 on the side far from the worm wheel 3 of the clamping plate spring 41 located on the other side (left side in FIG. 5) in the third direction, of the pair of clamping plate springs 41, intersects the radiation straight line L1 including the vector of the meshing reaction force F1 as viewed from the second direction. Further, the second portion 44 on the side far from the worm wheel 3 of the clamping plate spring 41 located on the one side (right side in FIG. 5) in the third direction, of the pair of clamping plate springs 41, intersects the radiation straight line L2 including the vector of the meshing reaction force F2 as viewed from the second direction.

Therefore, even when the support bearing 5 tends to move in the direction of the meshing reaction force F1 during operation, the momentum of the movement can be suppressed by elasticity of the second portion 44 on the side far from the worm wheel 3 of the clamping plate spring 41 located on the one side in the third direction. Further, the meshing reaction force F1 can be supported by the cylindrical surface portion 27 of the main holding portion 23.

Even when the support bearing 5 tends to move in the direction of the meshing reaction force F2 during operation, the momentum of the movement can be suppressed by elasticity of the second portion 44 on the side far from the worm wheel 3 of the clamping plate spring 41 located on the other side in the third direction. Further, the meshing reaction force F2 can be supported by the cylindrical surface portion 27 of the main holding portion 23.

In this example, as shown in FIG. 5, the circumferential range of the cylindrical surface portion 27 of the main holding portion 23 is restricted to intersect the radiation straight lines L1 and L2 including the vectors of the meshing reaction forces F1 and F2. Since an inclination angle of the radiation straight line L2 with respect to the third direction is smaller than an inclination angle of the radiation straight line L1 with respect to the third direction, a circumferential edge portion E2 of the cylindrical surface portion 27 on a radiation straight line L2 side (right side in FIG. 5) in the third direction can be located closer to the worm wheel 3 in the first direction (lower side in FIG. 5) than a circumferential edge portion E1 on a radiation straight line L1 side (left side in FIG. 5). Therefore, in this example, of the sub-holding portion 24 protruding radially outward from the end portion of the main holding portion 23 that is far from the worm wheel 3 (upper side in FIGS. 5 and 8) in the first direction, the large recessed portion 28, which is the portion where the pin 36 is disposed, is disposed on the radiation straight line L2 side (right side in FIG. 5) in the third direction. Accordingly, compared with the case where the large recessed portion 28 is disposed on the radiation straight line L1 side (left side in FIG. 5) in the third direction, the large recessed portion 28 can be disposed at a position close to the worm wheel 3 in the first direction. That is, by adopting the arrangement, a width dimension of the entire holding portion 21 including the main holding portion 23 and the sub-holding portion 24 in the first direction is suppressed as much as possible.

(2) Electric Power Steering Device

As shown in FIG. 1, the electric power steering device 48 of this example includes a steering wheel 49, a steering shaft 50, a steering column 51, a pair of universal joints 52*a* and 52*b*, an intermediate shaft 53, a steering gear unit 54, the worm gear reducer 1 and the electric motor 11 of this example.

The steering wheel 49 is supported and fixed to a rear end portion of the steering shaft 50. The steering shaft 50 is rotatably supported inside the steering column 51 supported by a vehicle body. A front end portion of the steering shaft 50 is connected to a pinion shaft 55 of the steering gear unit 54 via the rear universal joint 52*a*, the intermediate shaft 53, and the front universal joint 52*b*. Therefore, when a driver rotates the steering wheel 49, the rotation of the steering wheel 49 is transmitted to the pinion shaft 55 via the steering shaft 50, the pair of universal joints 52*a* and 52*b*, and the intermediate shaft 53. The rotation of the pinion shaft 55 is converted into straight line motion of a rack shaft (not shown) of the steering gear unit 54 meshing with the pinion shaft 55. As a result, by pushing and pulling a pair of tie rods 56, a steering angle corresponding to a rotational operation amount of the steering wheel 49 is applied to left and right steered wheels.

The electric power steering device 48 of this example is configured to be able to reduce the force required for the driver to operate the steering wheel 49, by increasing auxiliary power of the electric motor 11 by the worm gear reducer 1 and then applying the auxiliary power to the front end portion of the steering shaft 50.

In the case of carrying out the present disclosure, the worm gear reducer 1 and the electric motor 11 may be disposed at positions where the auxiliary power is applied to the pinion shaft or the rack shaft of the steering gear unit.

Second Example

A second example of the embodiment of the present disclosure will be described with reference to FIGS. 18 to 20.

In this example, a specific structure of an elastic clamping portion 7*a* is different from that of the first example.

Figure 18B:
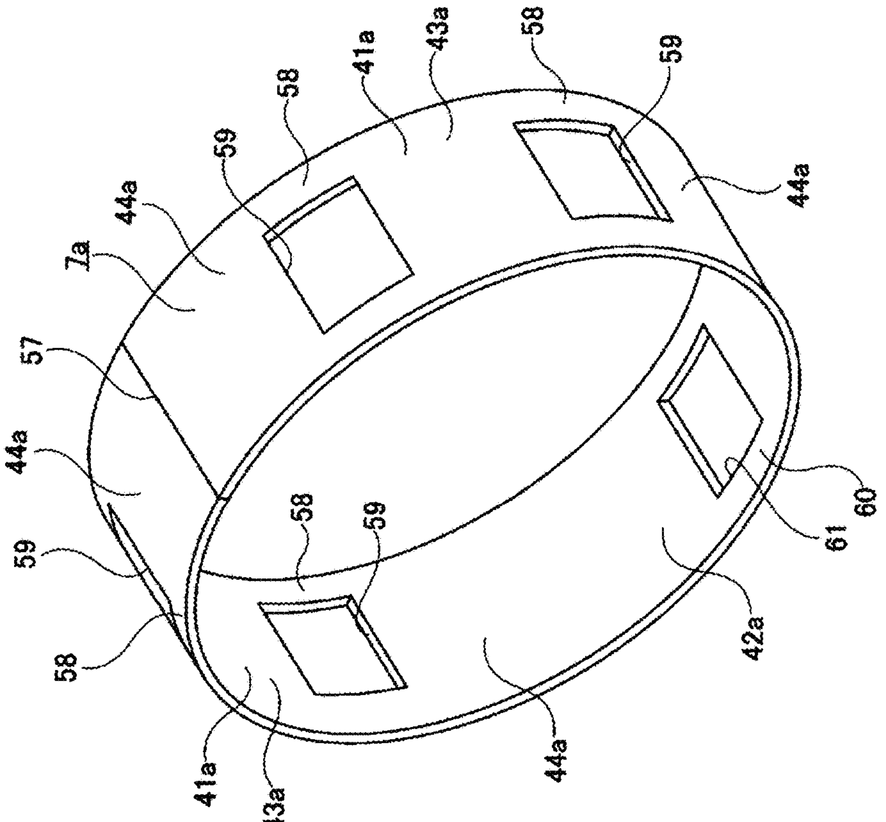
FIG. 18B is a perspective view of the elastic clamping portion.
Figure 18A:
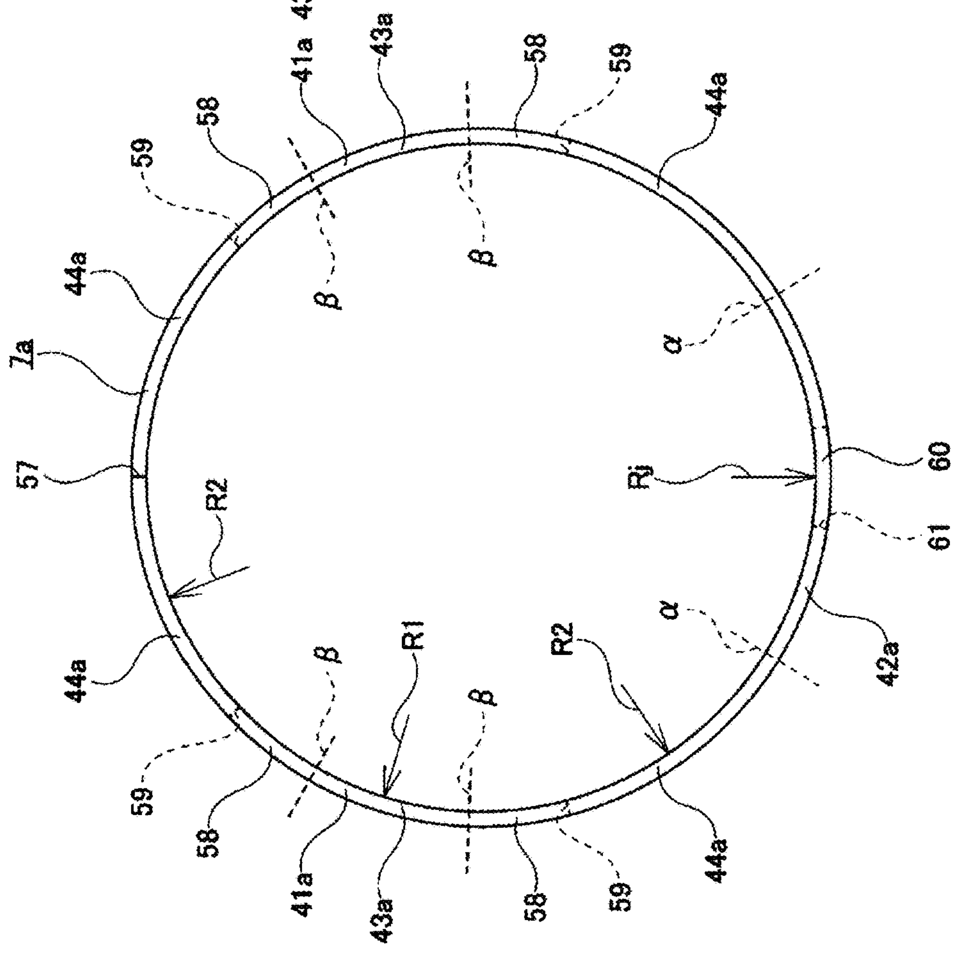
FIG. 18A is a side view of an elastic clamping portion in a second example of the embodiment of the present disclosure.

Specifically, as shown in (a) and (b) of FIG. 18, the elastic clamping portion 7*a* of this example in a free state has a cylindrical shape having a discontinuous portion (cut) 57 at one place in a circumferential direction, and a curvature radius of the inner circumferential surface is constant over the entire circumference.

More specifically, regarding each of the clamping plate springs 41*a* constituting the pair of clamping plate springs 41*a*, a radially inner surface of a first portion 43*a* located at a intermediate portion in the circumferential direction and radially inner surfaces of second portions 44*a* located at both side portions in the circumferential direction are smoothly continuous to each other, and the curvature radius R1 of the radially inner surface of the first portion 43*a* and the curvature radius R2 of the radially inner surface of the second portion 44*a* are equal to each other (R1=R2). Further, a radially inner surface of each of the clamping plate springs 41*a* constituting the pair of clamping plate springs 41*a* and a radially inner surface of the circumferential connection portion 42*a* are smoothly continuous, and the curvature radius R1 and R2 of the radially inner surface of the clamping plate spring 41*a* and the curvature radius Rj of the radially inner surface of the circumferential connection portion 42*a* are equal to each other (R1=R2=Rj). Circumferential end portions of the pair of clamping plate springs 41*a* on a side opposite the circumferential connection portion 42*a* abut on each other, and the abutting portion becomes a discontinuous portion 57. However, in the case of carrying out the present disclosure, the portion of the discontinuous portion 57 may be a gap portion where the circumferential end portions of the pair of clamping plate springs 41*a* on the side opposite the circumferential connection portion 42*a* are separated in the circumferential direction, or an overlapping portion where the circumferential end portions of the pair of clamping plate springs 41*a* on the side opposite the circumferential connection portion 42*a* overlap each other in the radial direction.

In this example, in the free state of the elastic clamping portion 7*a*, the curvature radius R1, R2, and Rj of the radially inner surfaces of the first portion 43*a*, the second portion 44*a*, and the circumferential connection portion 42*a* are smaller than the curvature radius Rs (see FIG. 5) of an outer circumferential surface of the support bearing 5 (R1=R2=Rj<Rs).

In this example, each of the second portions 44*a* has, on the circumferential end portion on a first portion 43*a* side, a low-rigidity plate spring portion 58 having rigidity lower than the remainder in the circumferential direction and the first portion 43*a*. In this example, in order to reduce the rigidity of the low-rigidity plate spring portion 58, a rectangular through hole 59 is formed in a circumferential portion where the low-rigidity plate spring portion 58 is located, thereby reducing a cross-sectional coefficient of the circumferential portion.

In the case of carrying out the present disclosure, portions different from those in this example, such as portions reducing the plate thickness of the low-rigidity portion, may be adopted as portions for reducing the rigidity of the low-rigidity portion.

The elastic clamping portion 7*a* is fitted around the support bearing 5 (see FIG. 5) by elastically expanding an inner diameter thereof and disposed inside the main holding portion 23 (see FIG. 5) constituting the holding portion 21. In this state, the pair of clamping plate springs 41*a* constituting the elastic clamping portion 7*a* are disposed on both sides in the third direction of the portion between the outer circumferential surface of the support bearing 5 and the main holding portion 23.

Figures 19A, 19B, 19C:
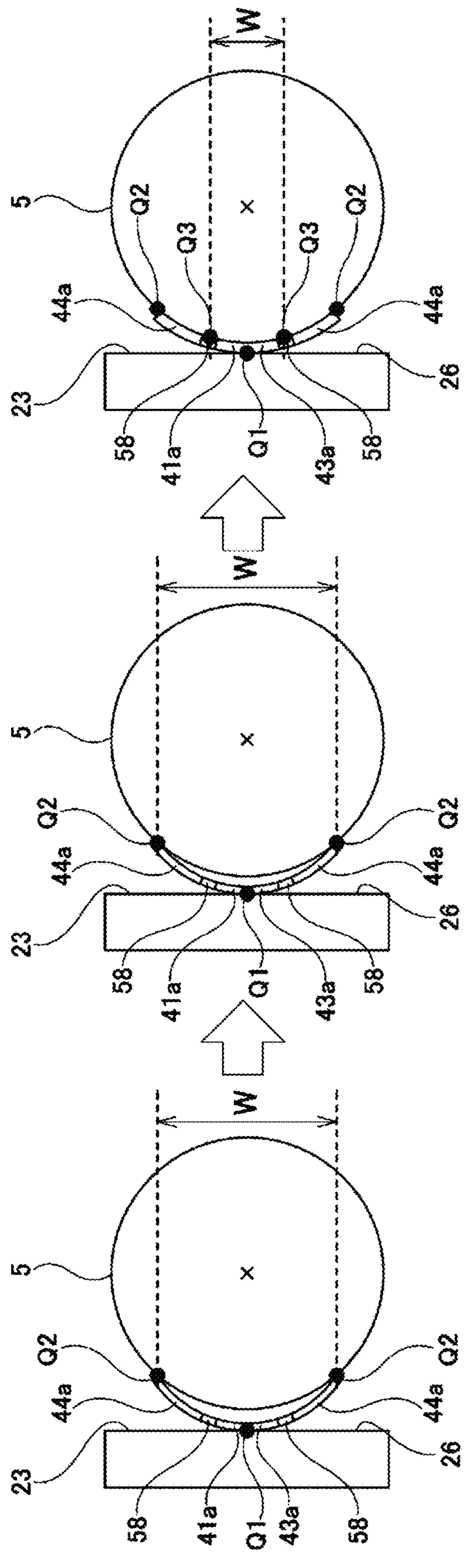
FIGS. 19A to 19C are diagrams schematically showing a state in which a deflection amount in a third direction of the elastic clamping portion (clamping plate spring) in the second example increases.
Figure 20:
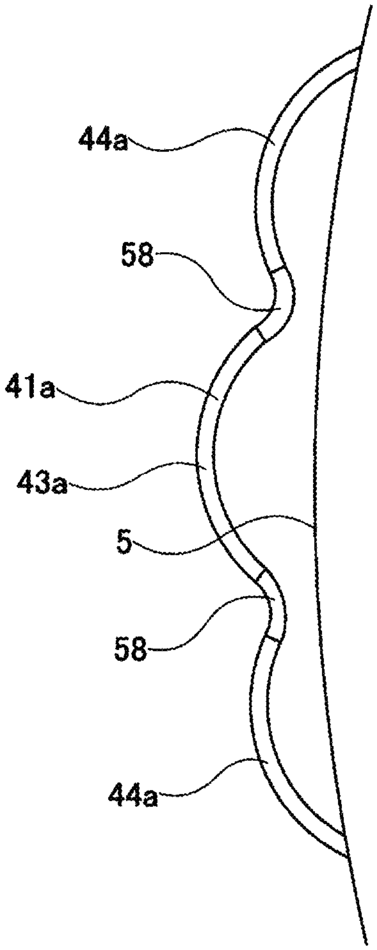
FIG. 20 is an exaggerated diagram schematically showing a state in which the elastic clamping portion (clamping plate spring) in the second example bends in the third direction.

In this example, the respective clamping plate springs 41*a* constituting the pair of clamping plate springs 41*a* are disposed as schematically shown in FIG. 19A relative to the surrounding portions when the meshing reaction forces F1 and F2 are zero. That is, a central portion of the radially outer surface of the first portion 43*a* in the circumferential direction is in contact with the flat portion 26 constituting the main holding portion 23 at the point Q1. An end portion of each of the second portions 44*a* on the circumferential outer side, that is, the end portion of the second portion 44*a* on the side far from the first portion 43*a* in the circumferential direction is in contact with the outer circumferential surface of the support bearing 5 at the point Q2. The radially inner surface of each of the first portion 43*a* and the second portion 44*a* is not in contact with the outer circumferential surface of the support bearing 5, and a gap is present between the radially inner surface of each of the first portion 43*a* and the second portion 44*a* and the outer circumferential surface of the support bearing 5. The radially outer surface of each of the second portions 44*a* is not in contact with the main holding portion 23, and a gap is present between the radially outer surface of each of the second portions 44*a* and the main holding portion 23. That is, the clamping plate spring 41*a* is in contact with the main holding portion 23 at only one place (point Q1), and is in contact with the outer circumferential surface of the support bearing 5 at only two places (points Q2).

In this example, when the meshing reaction force F1 or F2 increases, the pressing force in the third direction acting on the clamping plate spring 41*a* located on one side or the other side in the third direction from the support bearing 5 increases. Accordingly, the deflection amount of the clamping plate spring 41*a* in the third direction increases. FIGS. 19A to 19C are diagrams schematically showing how the deflection amount increases.

In this example, as the deflection amount of the clamping plate spring 41*a* in the third direction increases, the distance W in the first direction between contact portions of the two second portions 44 facing the outer circumferential surface of the support bearing 5 decreases stepwise as shown in the order of FIGS. 19A to 19C.

That is, in a stage where the deflection amount in the third direction is small (low load region), the distance W does not change substantially as shown in FIGS. 19A to 19C. On the other hand, in a state where the deflection amount in the third direction is large (high load region), as shown in FIG. 19C, each of the two second portions 44*a* is brought into contact with the outer circumferential surface of the support bearing 5 at the point Q3 not only on the end portion on the circumferential outer side but also on the end portion on the circumferential inner side, that is, the low-rigidity plate spring portion 58. This is because, as shown in an exaggerated form in FIG. 20, the low-rigidity plate spring portion 58 is curved more than other portions and approaches the outer circumferential surface of the support bearing 5. In the state shown in FIG. 19C, a distance between the contact portions of the low-rigidity plate spring portions 58 of the two second portions 44*a* facing the outer circumferential surface of the support bearing 5 is the distance W, and the distance W suddenly becomes smaller than that in the states shown in FIGS. 19A and 19B. Accordingly, the spring constant of the clamping plate spring 41*a* increases suddenly. In other words, in this example, the clamping plate spring 41*a* exhibits non-linear spring characteristics in which the spring constant changes in two steps as the deflection amount in the third direction increases.

In this example, since the elastic clamping portion 7*a* has a simple shape in which the curvature radius of the inner circumferential surface is constant in the free state, manufacturing cost of the elastic clamping portion 7*a* can be suppressed. Other configurations and operational effects of the third example are similar to those of the second example.

Third Example

Figure 21:
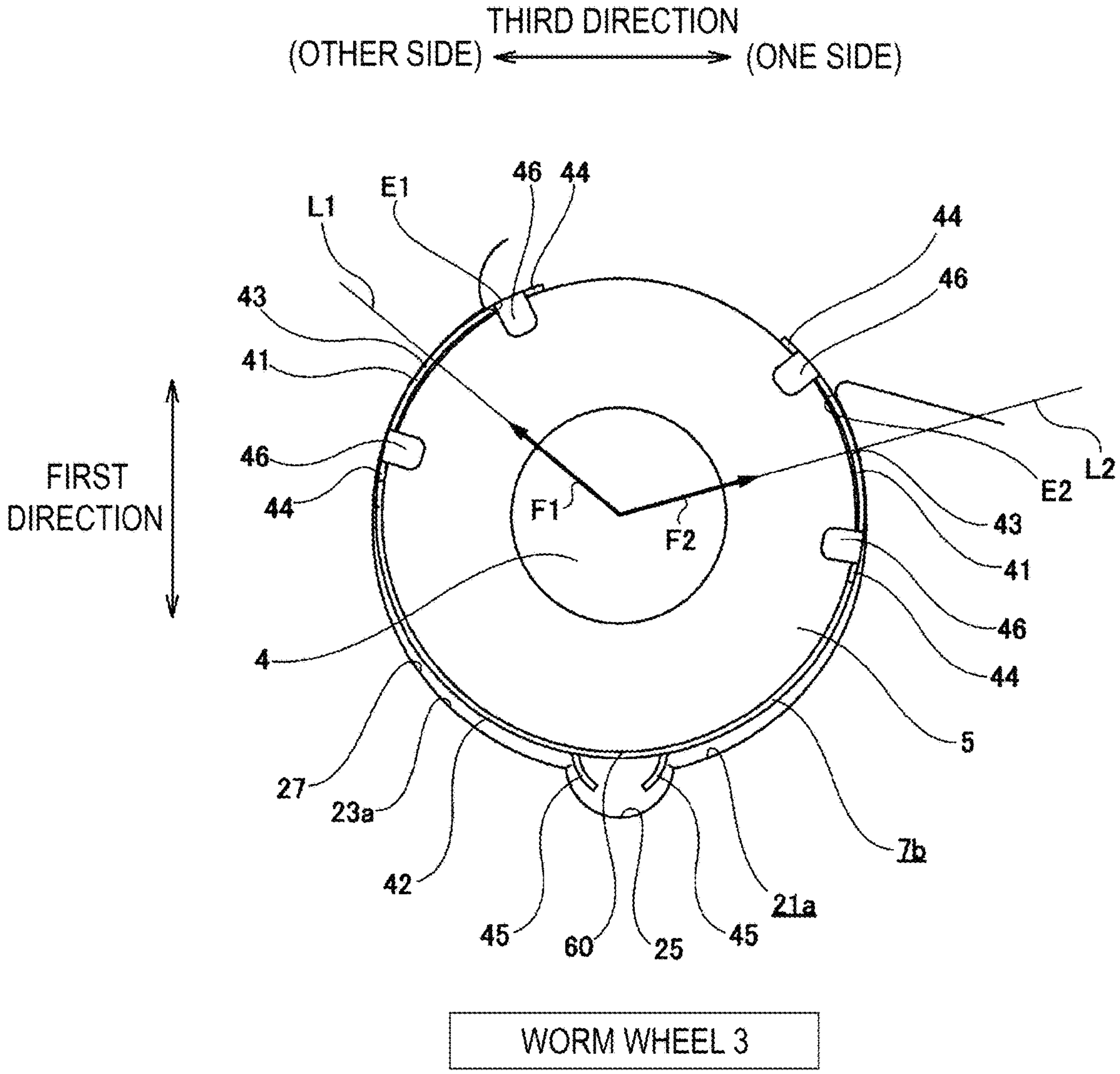
FIG. 21 is a diagram corresponding to a part of FIG. 5 in a third example of the embodiment of the present disclosure.

A third example of the embodiment of the present disclosure will be described with reference to FIG. 21.

In this example, the pair of clamping plate springs 41 constituting an elastic clamping portion 7*b* are disposed on a side farther from the worm wheel 3 than in the first example in the first direction. Specifically, in this example, the first portion 43 (more specifically, the central portion of the first portion 43 in the circumferential direction), which is the intermediate portion in the circumferential direction of one clamping plate spring 41 located on the other side (left side in FIG. 21) in the third direction, of the pair of clamping plate springs 41, intersects the radiation straight line L1 including the vector of the meshing reaction force F1 as viewed from the second direction. Further, the first portion 43 (more specifically, the central portion of the first portion 43 in the circumferential direction), which is the intermediate portion in the circumferential direction of the other clamping plate spring 41 located on one side (right side in FIG. 21) in the third direction, of the pair of clamping plate springs 41, intersects the radiation straight line L2 including the vector of the meshing reaction force F2 as viewed from the second direction.

In this example, the one clamping plate spring 41 exhibits a non-linear spring characteristic in which the spring constant increases as a deflection amount in a direction including a third-direction component (specifically, the deflection amount in the direction of the meshing reaction force F1) increases. The other clamping plate spring 41 exhibits a non-linear spring characteristic in which the spring constant increases as a deflection amount in a direction including the third-direction component (specifically, the deflection amount in the direction of the meshing reaction force F2) increases.

Therefore, in this example, when the support bearing 5 tends to move in the direction of the meshing reaction force F1, the momentum of the movement can be efficiently suppressed by elasticity of the one clamping plate spring 41. Further, when the support bearing 5 tends to move in the direction of the meshing reaction force F2, the force of the movement can be more efficiently suppressed by the elasticity of the other clamping plate spring 41.

In this example, the main holding portion 23 constituting the holding portion 21 does not have a pair of flat portions extending in the first direction on end portions on both sides in the third direction, and the entire in the circumferential direction is implemented the cylindrical surface portion 27. Other configurations and operational effects of the third example are similar to those of the first example.

The present disclosure can be implemented by appropriately combining the structures of the above-described embodiments as long as no contradiction occurs.

The present application is based on a Japanese patent application (No. 2022-123209) filed on Aug. 2, 2022, contents of which are incorporated herein by reference.

REFERENCE SIGNS LIST

1 worm gear reducer
2 housing
3 worm wheel
4 worm
5 support bearing
6 elastic urging portion
7, 7*a*, 7*b* elastic clamping portion
8 wheel accommodating portion

9 worm accommodating portion
10 lid body
11 electric motor
12 wheel teeth
13 worm teeth
14 ball bearing
15 output shaft
16 coupling
17 inner ring
18 outer ring
19 ball
20 small-diameter cylindrical surface portion
21 holding portion
22 stepped surface
23 main holding portion
24 sub-holding portion
25 locking portion
26 flat portion
27 cylindrical surface portion
28 large recessed portion
29 small recessed portion
30 first inclined surface portion
31 second inclined surface portion
32 first corner portion
33 second corner portion
34 third corner portion
35 recessed portion
36 pin
37 urging plate spring
38 band plate portion
39 base plate portion
40 folded-back plate portion
41, 41*a* clamping plate spring
42, 42*a* circumferential connection portion
43, 43*a* first portion
44, 44*a* second portion
45 circumferential position positioning piece
46 axial position positioning piece
47 retaining ring
48 electric power steering device
49 steering wheel
50 steering shaft
51 steering column
52*a*, 52*b* universal joint
53 intermediate shaft
54 steering gear unit
55 pinion shaft
56 tie rod
57 discontinuous portion
58 low-rigidity plate spring portion
59 through hole
60 low-rigidity connection portion
61 through hole

The invention claimed is:

1. A worm gear reducer comprising:

a housing including a wheel accommodating portion and a worm accommodating portion that has a central axis at a skew position with respect to a central axis of the wheel accommodating portion and whose intermediate portion in an axial direction is open to the wheel accommodating portion;

a worm wheel having wheel teeth on an outer circumferential surface thereof and configured to be rotatably supported inside the wheel accommodating portion;

a worm having worm teeth that mesh with the wheel teeth on an outer circumferential surface thereof and configured to be rotatably supported inside the worm accommodating portion;

a support bearing fitted around a tip end portion of the worm;

an elastic urging portion configured to urge a radially inner side member that is the support bearing or an outer fitting member fitted around the support bearing toward a worm wheel side; and an elastic clamping portion having a pair of clamping plate springs that are disposed on both sides of the radially inner side member in a third direction orthogonal to both a first direction, which is an urging direction by the elastic urging portion and a second direction, which is an axial direction of the worm accommodating portion, in a portion between an outer circumferential surface of the radially inner side member and an inner circumferential surface of a radially outer side member that is the worm accommodating portion or an inner fitting member fitted inside the worm accommodating portion, wherein each of the clamping plate springs constituting the pair of clamping plate springs exhibits a non-linear spring characteristic in which a spring constant increases as a deflection amount in a direction including a third-direction component increases the clamping plate springs associated with the elastic clamping portion are separate components from the elastic urging portion.

2. The worm gear reducer according to claim 1, wherein each of the clamping plate springs constituting the pair of clamping plate springs has an intermediate portion in a circumferential direction in contact with the inner circumferential surface of the radially outer side member, and opposite side portions in the circumferential direction in contact with the outer circumferential surface of the radially inner side member, and as the deflection amount in the direction including the third-direction component increases, the spring constant increases as a distance between contact portions of the opposite side portions in the circumferential with respect to the outer circumferential surface of the radially inner side member decreases.

3. The worm gear reducer according to claim 2, wherein an intermediate portion in the circumferential direction of each of the pair of clamping plate springs constituting the pair of clamping plate springs intersects a third direction straight line Lx that is a straight line that passes through a center of the worm and extends in the third direction when viewed from the second direction.

4. The worm gear reducer according to claim 3, wherein a portion of an inner circumferential surface of the radially outer side member that is in contact with the intermediate portion in the circumferential direction of each of the clamping plate springs constituting the pair of clamping plate springs is implemented by a flat portion extending in the first direction.

5. The worm gear reducer according to claim 2, wherein an intermediate portion in the circumferential direction of one clamping plate spring constituting the pair of clamping plate springs intersects a radiation straight line L1 including a vector of a meshing reaction force F1 applied to the worm from a meshing portion between the worm teeth and the wheel teeth when the worm rotates in a predetermined direction when viewed from a second direction, and an intermediate portion in the circumferential direction of the other clamping plate spring constituting the pair of clamping plate springs intersects a radiation straight line L2 including a vector of a meshing reaction force F2 applied to the worm from the meshing portion when the worm rotates in a direction opposite to the predetermined direction when viewed from the second direction.

6. The worm gear reducer according to claim 2, wherein in a target clamping plate spring that is at least any one of the pair of clamping plate springs, the intermediate portion in the circumferential direction is implemented by a first portion having a partial cylindrical shape curved along the outer circumferential surface of the radially inner side member, each of the side portions in the circumferential direction is implemented by a second portion having a partial cylindrical shape curved along the outer circumferential surface of the radially inner side member and smoothly continuous with the first portion, a curvature radius of a radially inner surface of the first portion in a free state is smaller than a curvature radius of the outer circumferential surface of the radially inner side member, and a curvature radius of a radially inner surface of the second portion in the free state is larger than the curvature radius of the radially inner surface of the first portion in the free state.

7. The worm gear reducer according to claim 2, wherein in a target clamping plate spring that is at least any one of the pair of clamping plate springs, the intermediate portion in the circumferential direction is implemented by a first portion having a partial cylindrical shape curved along the outer circumferential surface of the radially inner side member, each of the side portions in the circumferential direction is implemented by a second portion having a partial cylindrical shape curved along the outer circumferential surface of the radially inner side member and smoothly continuous with the first portion, curvature radii of radially inner surfaces of the first portion and each of the second portions in a free state are equal to each other and smaller than a curvature radius of the outer circumferential surface of the radially inner side member, and each of the second portions has, on a circumferential end portion of a first portion side, a low-rigidity plate spring portion having a lower rigidity than the remainder in the circumferential direction and the first portion.

8. The worm gear reducer according to claim 7, wherein each of the clamping plate springs constituting the pair of clamping plate springs is the target clamping plate spring, the elastic clamping portion has a circumferential connection portion that connects circumferential end portions of the pair of clamping plate springs on a side close to the worm wheel to each other in the circumferential direction, the circumferential connection portion has a partial cylindrical shape curved along the outer circumferential surface of the radially inner side member, and is smoothly continuous with the pair of clamping plate springs, and a curvature radius of a radially inner surface of the circumferential connection portion in the free state is equal to the curvature radii of the radially inner surfaces of the first portion and each of the second portions in the free state.

9. The worm gear reducer according to claim 1, wherein the elastic clamping portion has a circumferential connection portion connecting circumferential end portions of the pair of clamping plate springs on a side that is close to the worm wheel to each other in the circumferential direction.

10. The worm gear reducer according to claim 9, wherein the circumferential connection portion has a low-rigidity connection portion having rigidity lower than the pair of clamping plate springs in at least a part thereof in the circumferential direction.

11. The worm gear reducer according to claim 1, wherein for each of the clamping plate springs constituting the pair of clamping plate springs, a residual stress is applied to a portion that is in contact with the inner circumferential surface of the radially outer side member.

12. The worm gear reducer according to claim 1, wherein the elastic clamping portion has a circumferential position positioning piece engaged with the radially inner side member or the radially outer side member in the circumferential direction.

13. The worm gear reducer according to claim 1, wherein the elastic clamping portion has an axial position positioning piece engaged with the radially inner side member or the radially outer side member in the axial direction.

14. The worm gear reducer according to claim 1, wherein when a horizontal axis represents a deflection amount in the third direction and a vertical axis represents a load, the non-linear spring characteristic is represented by a graph that is downwardly convex, with a slope increasing as the deflection amount in the third direction increases.

* * * * *